US012434716B2

(12) United States Patent
Yamada et al.

(10) Patent No.: US 12,434,716 B2
(45) Date of Patent: Oct. 7, 2025

(54) HUMAN-POWERED VEHICLE CONTROL DEVICE, LEARNING METHOD, HUMAN-POWERED VEHICLE CONTROL METHOD AND COMPUTER PROGRAM

(71) Applicant: Shimano Inc., Osaka (JP)

(72) Inventors: Masataka Yamada, Osaka (JP); Kenji Tagawa, Osaka (JP); Takehiko Nakajima, Osaka (JP)

(73) Assignee: Shimano Inc., Osaka (JP)

( * ) Notice: Subject to any disclaimer, the term of this patent is extended or adjusted under 35 U.S.C. 154(b) by 279 days.

(21) Appl. No.: 18/105,097

(22) Filed: Feb. 2, 2023

(65) Prior Publication Data
US 2023/0311902 A1 Oct. 5, 2023

(30) Foreign Application Priority Data

Mar. 31, 2022 (JP) ................... 2022-060934

(51) Int. Cl.
*B60W 40/00* (2006.01)
*B60W 40/09* (2012.01)
(52) U.S. Cl.
CPC ......... *B60W 40/09* (2013.01); *B60W 2300/36* (2013.01)
(58) Field of Classification Search
CPC ............... B60W 40/09; B60W 2300/36; B62J 2001/085; B62J 45/41; B62J 45/20;
(Continued)

(56) References Cited

U.S. PATENT DOCUMENTS 6,047,230 A 4/2000 Spencer et al.
2019/0354850 A1* 11/2019 Watson ................. G06N 3/045
(Continued)

FOREIGN PATENT DOCUMENTS

JP 2020-142566 A 9/2020
JP 6985217 B2 11/2021

OTHER PUBLICATIONS

Tandon et al., "Design and Simulation of an Intelligent Bicycle Transmission System", IEEE/ASME Transactions on Mechatronics, vol. 16, No. 3, Jun. 2011.
(Continued)

*Primary Examiner* — Anne Marie Antonucci
*Assistant Examiner* — Jordan T Smith
(74) *Attorney, Agent, or Firm* — Global IP Counselors LLP; David Tarnoff

(57) ABSTRACT

A human-powered vehicle control device includes at least one sensor, a memory, a controller and an interpolation processor. The at least one sensor is configured to acquire input information related to traveling of a human-powered vehicle. The memory is configured to store a first learning model trained so as to output output information related to control of a device mounted on the human-powered vehicle based on the input information acquired. The controller is configured to control the device by control data decided based on output information obtained by inputting the input information to the first learning model. The interpolation processor is configured to execute processing of interpolating the first learning model in the memory using a second learning model trained with input information in a human-powered vehicle different in at least one of the human-powered vehicle and a rider of the human-powered vehicle.

22 Claims, 22 Drawing Sheets

(58) Field of Classification Search
CPC ...... B62J 50/20; B62K 2025/044; B62L 1/00;
B62M 6/40; B62M 9/133; B62M 25/08;
B62M 9/122; B62M 9/132; B62M 9/123;
G06N 3/084; G06N 3/098; G06N 3/044;
G06N 3/045; G06N 3/09; G06N 3/096;
G06N 3/0985
See application file for complete search history.

(56) References Cited

U.S. PATENT DOCUMENTS

| | | | |
|---|---|---|---|
| 2020/0012964 A1 | 1/2020 | Shimazu et al. | |
| 2020/0017117 A1* | 1/2020 | Milton | G08G 1/0112 |
| 2020/0210889 A1* | 7/2020 | Tsuji | G07C 5/0841 |
| 2020/0247498 A1* | 8/2020 | Yamamoto | B62J 45/413 |
| 2020/0283000 A1* | 9/2020 | Schön | B60W 40/08 |
| 2021/0009226 A1* | 1/2021 | Yamamoto | B62J 43/13 |
| 2021/0078629 A1* | 3/2021 | Boss | G07C 5/085 |
| 2021/0174209 A1* | 6/2021 | Zhuang | G06F 16/2379 |
| 2021/0383215 A1* | 12/2021 | Nakabayashi | G06N 3/08 |
| 2023/0245000 A1* | 8/2023 | Yang | G06N 3/04 706/12 |
| 2023/0368028 A1* | 11/2023 | Lupesko | G06N 20/20 |
| 2024/0270267 A1* | 8/2024 | Miyamichi | G07C 5/00 |

OTHER PUBLICATIONS

Vanwalleghem et al., "Sensor design for outdoor racing bicycle field testing for human vibration comfort evaluation", MEsurement Science Technology, 24 (2013) 095002 (11pp), 2013.

Lin et al., Design of an automatic shift control system with self-learning ability for a bicycle:, Journal of the Chinese Institute of Engineers, vol. 38, No. 5, 594-602, 2015.

Zhang et al., Rider Trunk and Bicycle Power Estimation With Fusion of Force/Internal Sensors, IEEE Transactions on Biomedical Engineering, vol. 60, No. 9, Sep. 2013.

* cited by examiner

FIG.15

FIRST LEARNING MODEL 11M

| ON-ROAD | | | OFF-ROAD | | | URBAN DISTRICT | | |
|---|---|---|---|---|---|---|---|---|
| UPHILL | FLAT | DOWNHILL | UPHILL | FLAT | DOWNHILL | UPHILL | FLAT | DOWNHILL |
| 11MA | 11MB | 11MC | | | | | | |

HUMAN-POWERED VEHICLE CONTROL DEVICE, LEARNING METHOD, HUMAN-POWERED VEHICLE CONTROL METHOD AND COMPUTER PROGRAM

CROSS-REFERENCE TO RELATED APPLICATIONS

This application claims priority to Japanese Patent Application No. 2022-060934, filed on Mar. 31, 2022. The entire disclosure of Japanese Patent Application No. 2022-060934 is hereby incorporated herein by reference.

BACKGROUND

Technical Field

The present invention generally relates to a human-powered vehicle control device, a learning method, a human-powered vehicle control method and a computer program.

Background Information

As electrification of human-powered vehicles has recently been increasing, automatic control of its mounted device including a transmission device has been achieved. A model has been proposed that is trained by deep learning so as to output information on control of the mounted devices in the case where information obtained if information acquired from at least one of a speed sensor, a cadence sensor, a torque sensor and a camera provided in the human-powered vehicle is input (Japanese Patent No. 6985217—Patent Document 1).

SUMMARY

By achieving automatic control of the human-powered vehicle with deep learning, automatic control on an individual rider basis can be optimized by taking the physical characteristics of the rider and preferences of the rider into account.

It is an object of the present disclosure to provide a human-powered vehicle control device, a learning method, a human-powered vehicle control method and a computer program that reduce the time required to train a model used for automatic control and achieve automatic control even in an untrained situation.

A human-powered vehicle control device according to the first aspect of the present disclosure comprises: at least one sensor, a memory, an electronic controller and an interpolation processor. The at least one sensor is configured to acquire input information related to traveling of a human-powered vehicle. The a memory is configured to store a first learning model trained so as to output output information related to control of a device mounted on the human-powered vehicle based on the input information acquired. The electronic controller is configured to control the device by control data decided based on output information obtained by inputting the input information to the first learning model. The interpolation processor is configured to execute processing of interpolating the first learning model stored in the memory using a second learning model trained with input information in a human-powered vehicle different in at least one of the human-powered vehicle and a rider of the human-powered vehicle.

According to the human-powered vehicle control device of the above-mentioned first aspect, the first learning model used for control of a device is interpolated by using the second learning model, which is different from the first learning model. In the case where learning is performed based on at least one of the human-powered vehicle and the rider individually, a situation in which the human-powered vehicle has not traveled is not learned. Interpolation of the first learning model using the second learning model reduces the time for learning input information in the unlearned traveling situation and enables automatic control itself.

For the human-powered vehicle control device according to a second aspect of the present disclosure, in the human-powered vehicle control device according to the above-mentioned first aspect, the interpolation processor is configured to update at least part of the first learning model stored in the memory with the second learning model.

According to the human-powered vehicle control device of the above-mentioned second aspect, interpolation using the second learning model reduces the time for learning input information in the unlearned traveling situation and enables automatic control itself.

For the human-powered vehicle control device according to a third aspect of the present disclosure, in the human-powered vehicle control device according to the above-mentioned first aspect, the interpolation processor is configured to train the first learning model using, as training data, input information acquired by the at least one sensor and output information output if the input information is input to the second learning model.

According to the human-powered vehicle control device of the above-mentioned third aspect, interpolation through learning using the output information output from the second learning model reduces the time for learning input information in the unlearned traveling situation and enables automatic control itself.

For the human-powered vehicle control device according to a fourth aspect of the present disclosure, in the human-powered vehicle control device according to any one of the above-mentioned first to third aspects, the first learning model is trained with input information acquired by the at least one sensor in a plurality of traveling situations different from each other, and as to a traveling situation that is an unlearned traveling situation different from a learned traveling situation learned by the first learning model and that is learned by a second learning model, the interpolation processor is configured to interpolate the first learning model using the second learning model.

According to the human-powered vehicle control device of the above-mentioned fourth aspect, interpolation is performed for each traveling situation. This reduces the time for learning input information in the unlearned traveling situation and enables automatic control itself.

For the human-powered vehicle control device according to a fifth aspect of the present disclosure, in the human-powered vehicle control device according to any one of the above-mentioned first to third aspects, the first learning model includes a plurality of learning models stored for each traveling situation, and the interpolation processor is configured to use, as a learning model corresponding to an unlearned traveling situation different from a learned traveling situation learned by the first learning model out of the plurality of learning models, a part of the second learning model that has already learned the unlearned traveling situation.

According to the human-powered vehicle control device of the above-mentioned fifth aspect, the learning model for the unlearned situation is stored as the learning model for the first learning model, which reduces the time for learning input information in the unlearned traveling situation and enables automatic control itself.

For the human-powered vehicle control device according to a sixth aspect of the present disclosure, in the human-powered vehicle control device according to the above-mentioned fourth or fifth aspect, the traveling situation is distinguished by at least one of on-road, off-road and urban district situations.

According to the human-powered vehicle control device of the above-mentioned sixth aspect, interpolation using the second learning model reduces the time for learning input information in the unlearned traveling situation out of the on-road, off-road and urban district situations and enables automatic control itself.

For the human-powered vehicle control device according to a seventh aspect of the present disclosure, in the human-powered vehicle control device according to any one of the above-mentioned fourth to sixth aspects, the traveling situation is distinguished by at least one of uphill, flat and downhill situations.

According to the human-powered vehicle control device of the above-mentioned seventh aspect, interpolation using the second learning model reduces the time for learning input information in the unlearned traveling situation out of the uphill, flat and downhill situations, and enables automatic control itself.

For the human-powered vehicle control device according to an eighth aspect of the present disclosure, in the human-powered vehicle control device according to any one of the above-mentioned first to seventh aspects, the interpolation processor is configured to use the second learning model for which output information output if the same input information is input is similar to output information output if the input information is input to the first learning model.

According to the human-powered vehicle control device of the above-mentioned eighth aspect, interpolation using the similar second learning model reduces the time for learning input information in the unlearned traveling situation and enables automatic control itself.

For the human-powered vehicle control device according to a ninth aspect of the present disclosure, in the human-powered vehicle control device according to the above-mentioned eighth aspect, the first learning model is trained with input information acquired by the at least one sensor for a plurality of traveling situations different from each other, and out of a plurality of the second learning models, the interpolation processor is configured to use the second learning model for which output information output if input information in a traveling situation already learned by the first learning model is input is similar to output information output if the input information is input to the first learning model.

According to the human-powered vehicle control device of the above-mentioned ninth aspect, interpolation using the similar second learning model reduces the time for learning input information in the unlearned traveling situation out of the on-road, off-road and urban district situations and enables automatic control itself.

For the human-powered vehicle control device according to a tenth aspect of the present disclosure, in the human-powered vehicle control device according to the above-mentioned eighth aspect, the first learning model and the second learning model each include a plurality of learning models stored for each traveling situation. The interpolation processor is configured to use, out of a plurality of the second learning models, the second learning model for which output information output if input information in a traveling situation already learned by the first learning model is input is similar to output information output if the input information is input to the first learning model. The interpolation processor is configured to acquire, out of the plurality of learning models included in the second learning model, the learning model that corresponds to an unlearned traveling situation different from the learned traveling situation.

According to the human-powered vehicle control device of the above-mentioned tenth aspect, interpolation using the learning model included in the second learning model as a learning model for the first learning model reduces the time for learning input information in the unlearned traveling situation and enables automatic control itself.

For the human-powered vehicle control device according to an eleventh aspect of the present disclosure, in the human-powered vehicle control device according to any one of the above-mentioned first to seventh aspects, the interpolation processor is configured to use a second learning model used in another human-powered vehicle control device similar in control data decided based on the same input information.

According to the human-powered vehicle control device of the above-mentioned eleventh aspect, interpolation using the second learning model that outputs similar control data reduces the time for learning input information in the unlearned traveling situation and enables automatic control itself.

For the human-powered vehicle control device according to a twelfth aspect of the present disclosure, in the human-powered vehicle control device according to the above-mentioned eleventh aspect, the first learning model is trained with input information acquired by the at least one sensor in a plurality of traveling situations different from each other, and the interpolation processor is configured to use, out of a plurality of the second learning models, the second learning model for which control data decided based on output information output if input information in a traveling situation already learned by the first learning model is input is similar to control data decided based on output information output if the input information is input to the first learning model.

According to the human-powered vehicle control device of the above-mentioned twelfth aspect, interpolation using the second learning model that outputs similar control data reduces the time for learning input information in the unlearned traveling situation and enables automatic control itself.

For the human-powered vehicle control device according to a thirteenth aspect of the present disclosure, in the human-powered vehicle control device according to the above-mentioned eleventh aspect, the first learning model and the second learning model each include a plurality of learning models stored for each traveling situation. The interpolation processor is configured to use, out of a plurality of the second learning models, the second learning model for which control data decided based on output information output if input information in a traveling situation already learned by the first learning model is input is similar to control data decided based on output information output if the input information is input to the first learning model. The interpolation processor is configured to acquire, out of the plurality of learning models included in the second learning model, the learning model corresponding to an unlearned traveling situation different from the learned traveling situation.

According to the human-powered vehicle control device of the above-mentioned thirteenth aspect, interpolation performed by storing, as a learning model for the first learning model, the learning model included in the second learning model that outputs similar control data reduces the time for learning input information for the unlearned traveling situation and enables automatic control itself.

For the human-powered vehicle control device according to a fourteenth aspect of the present disclosure, in the human-powered vehicle control device according to any one of the above-mentioned first to seventh aspects, the interpolation processor is configured to use, out of a plurality of the second learning models, the second learning model that is trained with input information in another human-powered vehicle the same as or similar to, in at least one of type and size, the human-powered vehicle.

According to the human-powered vehicle control device of the above-mentioned fourteenth aspect, interpolation using the second learning model of a human-powered vehicle similar in type and size of the human-powered vehicle reduces the time for learning input information in the unlearned traveling situation and enables automatic control itself.

For the human-powered vehicle control device according to a fifteenth aspect of the present disclosure, in the human-powered vehicle control device according to any one of the above-mentioned first to seventh aspects, the interpolation processor is configured to use, out of a plurality of the second learning models, the second learning model that is trained with input information of another human-powered vehicle mounted with a device having the same type and manufacture as or similar type and manufacturer to the device.

According to the human-powered vehicle control device of the above-mentioned fifteenth aspect, interpolation using a similar second learning model of a human-powered vehicle mounted with a device having the same as or similar to the device of the human-powered vehicle reduces the time for learning input information in the unlearned traveling situation and enables automatic control itself.

For the human-powered vehicle control device according to a sixteenth aspect of the present disclosure, in the human-powered vehicle control device according to the above-mentioned fifteenth aspect, the device is distinguished by at least one type of a transmission device, a suspension, a seat post, a brake device and an assist device.

According to the human-powered vehicle control device of the above-mentioned sixteenth aspect, interpolation using a second learning model of a human-powered vehicle mounted with the transmission device, suspension, seat post, brake device and assist device the same as or similar to those mounted on the human-powered vehicle reduces the time for learning input information in the unlearned traveling situation and enables automatic control itself.

For the human-powered vehicle control device according to a seventeenth aspect of the present disclosure, in the human-powered vehicle control device according to any one of the above-mentioned first to seventh aspects, the interpolation processor is configured to use, out of a plurality of the second learning models, the second learning model that is trained with input information for a human-powered vehicle of a rider of the same type as or similar type to a rider of the human-powered vehicle.

According to the human-powered vehicle control device of the above-mentioned seventeenth aspect, interpolation using the second learning model trained in a human-powered vehicle of a rider of the same type as or similar type to a rider of the human-powered vehicle reduces the time for learning input information in the unlearned traveling situation and enables automatic control itself.

For the human-powered vehicle control device according to an eighteenth aspect of the present disclosure, in the human-powered vehicle control device according to any one of the above-mentioned first to seventeenth aspects, the first learning model stored in the memory is sent to another device.

According to the human-powered vehicle control device of the above-mentioned eighteenth aspect, the first learning model trained in each human-powered vehicle is sent and available for interpolation of the first learning model of another human-powered vehicle.

For the human-powered vehicle control device of a nineteenth aspect of the present disclosure, in the human-powered vehicle control device according to any one of the above-mentioned first to eighteenth aspects, the second learning model is a model acquired by performing static processing on parameters including at least one of weights and biases of a plurality of models trained in a plurality of other human-powered vehicles.

According to the human-powered vehicle control device of the above-mentioned nineteenth aspect, a model acquired by performing statistic processing on parameters including at least one of the weights and biases of the first learning model trained in each human-powered vehicle is available for interpolation of the first learning model in another human-powered vehicle.

A learning method according to a twenty aspect of the present disclosure causes a computer mounted on a human-powered vehicle to execute processing of: selecting externally, as to a first learning model trained so as to output output information related to control of a device mounted on the human-powered vehicle based on input information related to traveling of the human-powered vehicle, a second learning model trained with input information in a human-powered vehicle different in at least one of the human-powered vehicle and a rider of the human-powered vehicle; and performing interpolation processing of the first learning model using the second learning model selected.

According to the learning method according to the above-mentioned twentieth aspect, interpolation of the first learning model using the second learning model reduces the time for learning input information in the unlearned traveling situation and enables automatic control itself.

A human-powered vehicle control method according to the above-mentioned twenty-first aspect causes a computer mounted on a human-powered vehicle to execute the processing of: selecting externally, as to a first learning model trained so as to output output information related to control of a device mounted on the human-powered vehicle based on input information related to traveling of the human-powered vehicle, a second learning model trained with input information in a human-powered vehicle different in at least one of the human-powered vehicle and a rider of the human-powered vehicle; performing interpolation processing of the first learning model using the second learning model selected; deciding control data based on output information obtained by inputting the input information to the first learning model interpolated; and controlling the device with the control data decided.

According to the human-powered vehicle control method of the above-mentioned twenty-first aspect, interpolation of the first leaning model using the second learning model reduces the time for learning input information in the unlearned traveling situation and enables automatic control itself.

A computer program according to a twenty-second aspect of the present disclosure is disposed upon a non-transitory computer readable storage medium and executable by a computer mounted on a human-powered vehicle. The computer program is configured to cause the computer to execute the processing of: selecting externally, as to a first learning model trained so as to output output information related to control of a device mounted on the human-powered vehicle based on input information related to traveling of the human-powered vehicle, a second learning model trained with input information in a human-powered vehicle different in at least one of the human-powered vehicle and a rider of the human-powered vehicle; and performing interpolation processing of the first learning model using the second learning model selected.

According to the computer program of the above-mentioned twenty-second aspect, interpolation of the first leaning model using the second learning model can reduces the time for learning input information in the unlearned traveling situation and enables automatic control itself.

The human-powered vehicle control device, learning method, human-powered vehicle control method and computer program according to the present disclosure can reduce the time required to train a model used for automatic control and achieve automatic control even in the unlearned situation.

BRIEF DESCRIPTION OF THE DRAWINGS

Referring now to the attached drawings which form a part of this original disclosure.

FIG. 15 illustrates the first learning model according to a fifth embodiment.

DESCRIPTION OF EMBODIMENTS

The descriptions of the embodiments below are examples of forms that a human-powered vehicle control device, a learning method, a human-powered vehicle control method and a computer program according to the present disclosure can take, and there is no intention to limit the forms. The human-powered vehicle control device, learning method, human-powered vehicle control method and computer program according to the present disclosure can take forms different from the embodiments, such as forms of modification of the embodiments and a combination of at least two modifications that do not contradict each other.

In the following description of each of the embodiments, the terms indicating direction, such as front, back, forward, backward, left, right, sideways, upper, lower and so on are used with reference to the directions seen as the user sits in the saddle of a human-powered vehicle.

In each of the following embodiments, the human-powered vehicle control device according to the present disclosure is referred to as a control device and described below.

First Embodiment

Figure 1:
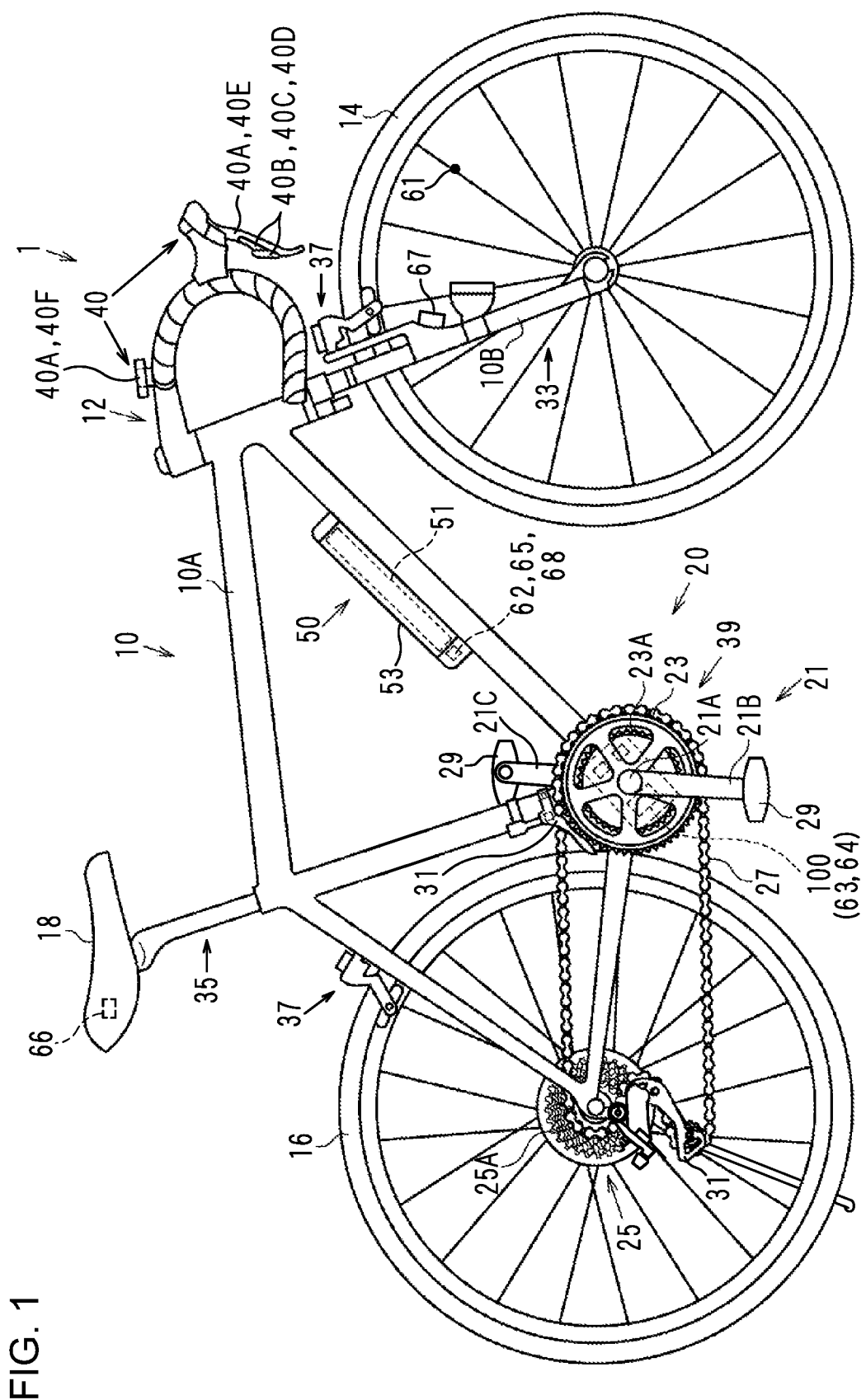
FIG. 1 is a side elevational view of a human-powered vehicle to which a control device is applied according to a first embodiment.

FIG. 1 is a side elevational view of a human-powered vehicle 1 to which a control device 100 is applied according to a first embodiment. The human-powered vehicle 1 is a vehicle that at least partially uses man power as a driving force for traveling. Vehicles using only an internal combustion engine or an electric motor as a driving force are excluded from the human-powered vehicle 1 according to the present embodiment. The human-powered vehicle 1 is a bicycle including, for example, a mountain bicycle, a road bicycle, a cross bicycle, a city cycle and an electric assisted bicycle (e-bike).

The human-powered vehicle 1 is provided with a vehicle main body 10, a handlebar 12, a front wheel 14, a rear wheel 16 and a saddle 18. The human-powered vehicle 1 is provided with a driving mechanism 20, a device 30, an operation device 40, a battery 50 and a sensor 60.

The vehicle main body 10 is provided with a frame 10A and a front fork 10B. The front wheel 14 is rotatably supported to the front fork 10B. The rear wheel 16 is rotatably supported to the frame 10A. The handlebar 12 is supported to the frame 10A so as to be able to change the direction of proceeding of the front wheel 14.

The driving mechanism 20 includes a crank 21, a first sprocket assembly 23, a second sprocket assembly 25, a chain 27 and a pair of pedals 29.

The crank 21 includes a crank shaft 21A, a right crank 21B and a left crank 21C. The crank shaft 21A is rotatably supported to the frame 10A. The right crank 21B and the left crank 21C are coupled to the crank shaft 21A. One of the pair of pedals 29 is rotatably supported to the right crank 21B. The other one of the pair of pedals 29 is rotatably supported to the left crank 21C.

The first sprocket assembly 23 is coupled to the crank shaft 21A so as to be rotatable as one piece. The first sprocket assembly 23 includes one or more sprockets 23A. The first sprocket assembly 23 includes the multiple sprockets 23A different in outer diameters as one example.

The second sprocket assembly 25 is rotatably coupled to a rear hub of the rear wheel 16. The second sprocket assembly 25 includes one or more sprockets 25A. The second sprocket assembly 25 includes the multiple sprockets 25A different in outer diameters as one example.

The chain 27 is entrained about any of the sprockets 23A of the first sprocket assembly 23 and any of the sprockets 25A of the second sprocket assembly 25. When the crank 21 rotates forwardly by a human-powered driving force applied to the pedals 29, the sprocket 23A rotates forwardly together with the crank 21. The rotation of the sprocket 23A is transmitted to the sprocket of the second sprocket assembly 25 via the chain 27. The rotation of the sprockets 25A rotates the rear wheel 16. A belt or a shaft can be employed instead of the chain 27.

The control device 100 is mounted on the battery 50, a cycle computer, a drive unit or the like of the human-powered vehicle 1 as one example. The control device 100 is connected to the device 30, the operation device 40 and the battery 50. The connected manner and the details of the control device 100 will be described later.

The human-powered vehicle 1 is provided with the device 30 that is operated by power supplied from the battery 50 and is controlled in its operation by the control device 100. The device 30 includes a transmission device 31, a suspension 33, a seat post 35, a brake device 37 and an assist device 39. The device 30 is basically operated through control by the control device 100 according to an operation through the operation device 40. The target to be controlled of the control device 100 corresponds to at least one of the device 30, the transmission device 31, the suspension 33, the seat post 35, the brake device 37 and the assist device 39.

The transmission device 31 changes a ratio of the rotational speed of the rear wheel 16 to the rotational speed of the crank 21, i.e., the gear ratio of the human-powered vehicle 1. The gear ratio is expressed as a ratio of the output rotational speed output from the transmission device 31 to the input rotational speed input to the transmission device 31. The gear ratio is expressed by the following formula: "gear ratio=output rotational speed/input rotational speed." As a first example, the transmission device 31 is an external transmission (rear derailleur) for shifting a coupled state between the second sprocket assembly 25 and the chain 27. As a second example, the transmission device 31 is an external transmission (front derailleur) for shifting a coupled state between the first sprocket assembly 23 and the chain 27. As a third example, it is an internal transmission disposed at a hub of the rear wheel 16. The transmission device 31 can be an infinitely variable transmission.

The suspension device 33 is a front suspension that is disposed at the front fork 10B and is for damping the shock applied to the front wheel 14 as one example. The suspension 33 can be a rear suspension that is disposed at the frame 10A and is for damping the shock applied to the rear wheel 16 in another example. The suspension 33 includes a motor and can control the motor by rotating or locking the motor according to control data including a damping ratio, a stroke amount and whether to change to a lockout state. The suspension 33 includes a valve for controlling the flow path for an internal oil or a solenoid valve and can be controlled by control data including a damping ratio, a stroke amount and whether to change to a lockout state.

The seat post 35 is attached to the frame 10A. The seat post 35 includes a motor. The seat post 35 includes a motor and raises or lowers the saddle 18 relative to the frame 10A. The seat post 35 can be controlled by rotating the motor with control data including a support position.

The brake device 37 includes a front brake device 371 configured to brake the front wheel 14 and a rear brake device 372 configured to brake the rear wheel 16. The front brake device 371 and the rear brake device 372 each include a caliper brake device, a disk brake device, or the like. The front brake device 371 and the rear brake device 372 each include a motor or the like that activates a caliper brake device or a disk brake device, and can change a braking force.

The assist device 39 assists the human driving force for the human-powered vehicle 1. As one example, the assist device 39 is disposed inside a drive unit. The assist device 39 is, as one example, disposed at the battery 50. The assist device 39 includes a motor. The assist device 39 is, as one example, disposed between the crank shaft 21A and the frame 10A and transmits torque to the first sprocket assembly 23 to thereby assist the human-powered driving force to the human-powered vehicle 1. The assist device 39, as one example, drives the chain 27 for transmitting a driving force to the rear wheel 16 of the human-powered vehicle 1 to thereby assist the human-powered driving force to the human-powered vehicle 1.

The operation device 40 is disposed at the handlebar 12. The operation device 33 includes one or more user operated members. The user operated members are not limited to those illustrated FIG. 1, and can include, for example, a button, a switch, a lever, a dial and/or a touch screen. Here, as seen in FIG. 1, the operation device 40 includes at least one operation member 40A to be operated by the rider. The operation member 40A includes one or more buttons. The operation member 40A includes one or more brake levers. Here, the operation device 40 includes a pair of dual brake-shift levers as the operation members 40A, which are provided at left and right sides of the handlebar 12. The operation members 40A are operable by moving the brake levers sideways towards a center plane of the human-powered vehicle 1 for performing a shifting operation. The operation members 33A (the dual brake-shift levers) can also be pivoted in a rearward direction for performing a braking operation. The information terminal device 8 held by the rider can be used as the operation member 40A.

The operation device 40 includes a pair of transmission designating members 40B. As one example, the transmission designating members 40B correspond to multiple buttons that are provided to the operation member 40A. As another example, the transmission designating members 40B are devices attached to the brake levers. Every time the rider performs the operation of moving one of the brake levers or pressing a button among the plurality of buttons on the transmission designating member 40B, he/she can perform manual operation on the transmission device 31 to increase the gear ratio or decrease the gear ratio.

The operation device 40 includes a suspension designating member 40C. The suspension designating member 40C corresponds to at least one button provided to the operation unit 40A, for example. By pressing the button(s) corresponding to the suspension designating member 40C, control data such as damping rate and stroke of the suspension can be set.

The operation device 40 includes a seat post designating member 40D. The seat post designating member 40D corresponds to at least one button provided to the operation member 40A, for example. The saddle 351 can be raised or lowered by pressing the button(s) corresponding to the seat post designating member 40D.

The operation device 40 includes a braking designating member 40E. The braking designating member 40E includes one or more brake levers. Operation of the brake levers allow activation of a caliper brake system or a disc brake system of the brake devices 37.

The operation device 40 includes an assist designating member 40F. The assist designating member 40F corresponds to at least one button provided to the operation member 40A, for example. By pressing the button(s) corresponding to the assist designating member 40F, the assist mode can be set to any one of multiple stages (high/mean/low).

The operation device 40 is communicably connected to the control device 100 so as to send a signal corresponding to an operation to the control device 100. The operation device 40 can communicably be connected to the transmission unit 31, the suspension 33, the seat post 35, the brake device 37 and the assist device 39 so as to send thereto a signal in response to an operation. As a first example, the operation device 40 communicates with the control device 100 through a communication line or an electric wire that allows for Power Line Communication (PLC). The operation device 40 can communicate with the transmission device 31, the suspension 33, the seat post 35, the brake device 37, the assist device 39 and the control device 100 through a communication line or an electric wire that allows for PLC. As a second example, the operation device 40 wirelessly communicates with the control device 100. The operation device 40 can wirelessly communicate with the transmission device 31, the suspension 33, the seat post 35, the brake device 37, the assist device 39 and the control device 100.

The operation device 40 can be provided with a notification device that generates a notification of an operating state. The operation device 40 can notify a control state for the transmission device 31, the suspension 33, the seat post 35, the brake device 37 and the assist device 39 to the rider with a lamp, a display, a speaker or the like.

The battery 50 includes a battery main body 51 and a battery holder 53. The battery main body 51 is a rechargeable battery including one or more battery cells. The battery holder 53 is fixed at the frame 10A of the human-powered vehicle 1. The battery main body 51 is attachable to and detachable from the battery holder 53. The battery 50 is electrically connected to the device 30, the operation device 40 and the control device 100 to supply power to them as necessary. The battery 50 preferably includes an electronic controller for communicating with the control device 100. The electronic controller preferably includes a processor employing a CPU.

The human-powered vehicle 1 is provided with the sensor 60 at each site for acquiring information related to traveling including a state of the rider and a traveling environment. The term "sensor" as used herein refers to a hardware device or instrument designed to detect the presence or absence of a particular event, object, substance, or a change in its environment, and to emit a signal in response. The term "sensor" as used herein does not include a human being. The sensor 60 includes a speed sensor 61, an acceleration sensor 62, a torque sensor 63, a cadence sensor 64, a gyro sensor 65, a seating sensor 66, a camera 67 and a position information sensor 68.

The speed sensor 61 is disposed at the front wheel 14, for example, and transmits to the control device 100 a signal corresponding to the number of rotations per unit time of the front wheel 14. The control device 100 can calculate a vehicle speed and a travel distance for the human-powered vehicle 1 based on the output of the speed sensor 61.

The acceleration sensor 62 is secured at the frame 10A, for example. The acceleration sensor 62 is a sensor for outputting vibrations of the human-powered vehicle 1 in three-axes (front-back direction, right-left direction and up-down direction) relative to the frame 10A and is disposed for detecting a movement and a vibration of the human-powered vehicle 1. The acceleration sensor 62 transmits signals corresponding to the magnitude of the movement and vibrations to the control device 100.

The torque sensor 63 is disposed so as to measure respective torques applied to the right crank 21B and the left crank 21C, for example. The torque sensor 63 outputs a signal corresponding to the torque measured at least one of the right crank 21B and the left crank 21C to the control device 100.

The cadence sensor 64 is disposed so as to measure a cadence of any one of the right crank 21B and the left crank 21C, for example. The cadence sensor 64 transmits a signal corresponding to the measured cadence to the control device 100.

The gyro sensor 65 is secured at the frame 10A, for example. The gyro sensor 65 is disposed so as to detect yaw, roll and pitch rotations of the human-powered vehicle 1. The gyro sensor 65 transmits signals corresponding to the respective rotation amounts in the three axes to the control device 100. Yaw is a rotation about the vertical axis. Roll is a rotation about the forward-backward axis. Pitch is a rotation about the left-right axis.

The seating sensor 66 is disposed on the internal surface of the saddle 351 so as to measure whether or not the rider is seated in the saddle 351. The seating sensor 66 employs a piezoelectric sensor, for example and transmits a signal corresponding to the weight applied to the saddle 351 to the control device 100.

The camera 67 is mounted on the front fork 10B so as to face the front. As a first example, the camera 67 is mounted on the front fork 10B so as to face the front together with a light. As a second example, the camera 67 is provided at the handlebar 12. The camera 67 outputs video corresponding to the user's field of vision by using a camera module. The camera 67 outputs a video signal obtained by photographing an object present in the direction of travel.

The position information sensor 68 is secured at the frame 10A, for example. The position information sensor 68 is disposed for detecting information on the position of the human-powered vehicle 1. For example, the position information sensor 68 is disposed for detecting information on the terrestrial longitude and latitude of the human-powered vehicle 1. For example, the position information sensor 68 is a GPS sensor. The position information sensor 68 transmits signals corresponding to the positions of the human-powered vehicle 1 to the control device 100.

As needed and/or desired, the sensor 60 does not include all of the speed sensor 61, the acceleration sensor 62, the torque sensor 63, the cadence sensor 64, the gyro sensor 65, the seating sensor 66, the camera 67 and the position information sensor 68.

Figure 2:
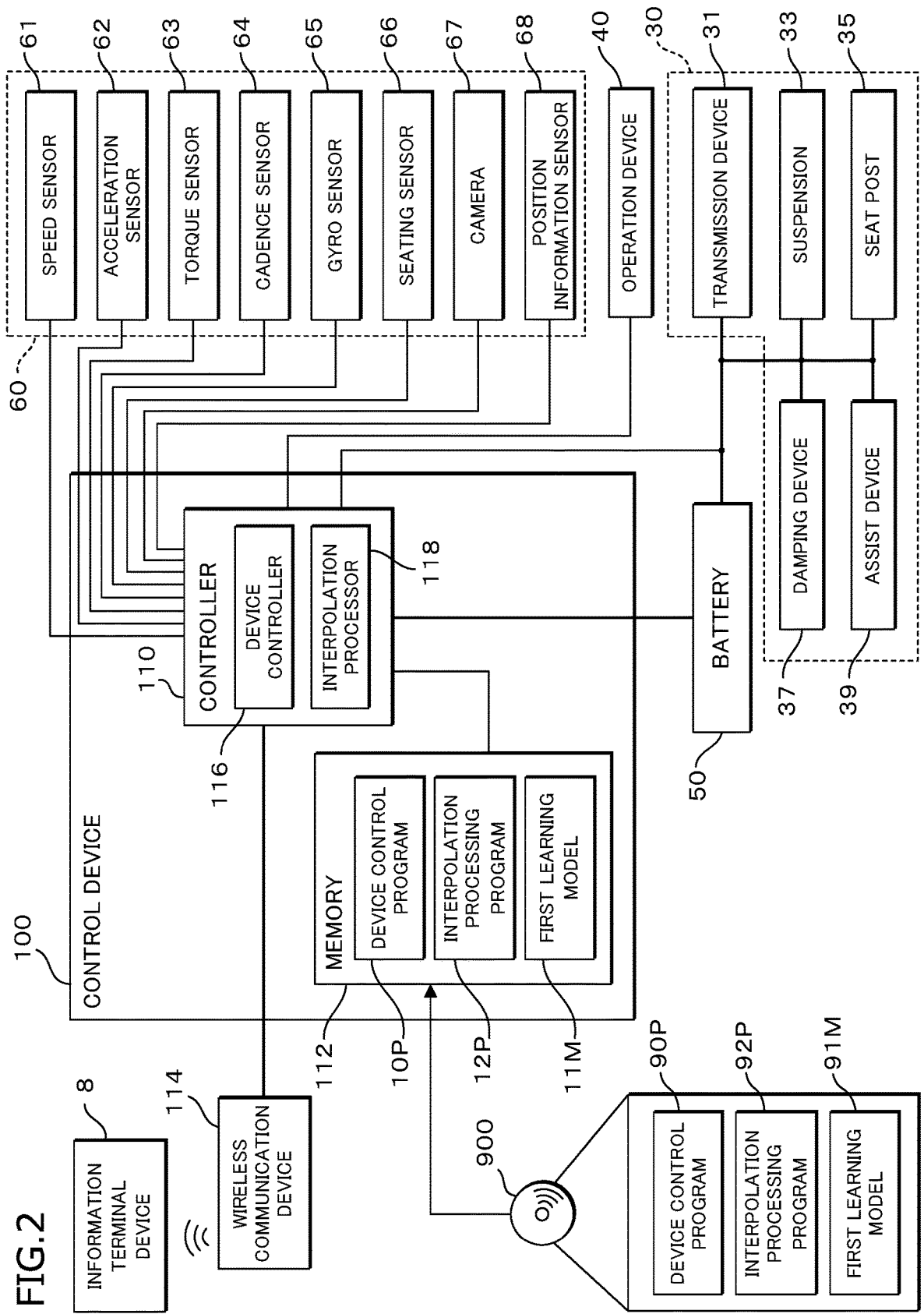
FIG. 2 is a block diagram illustrating the configuration of the control device.

FIG. 2 is a block diagram illustrating the configuration of the control device 100. The control device 100 includes an electronic controller 110 and a memory 112. The electronic controller 110 is preferably a microcomputer that includes one or more processors. The electronic controller 110 is formed of one or more semiconductor chips that are mounted on a printed circuit board. The terms "controller" and "electronic controller" as used herein refer to hardware that executes a software program, and does not include a human being. The electronic controller 110 can also be simply referred to as the controller 110. The memory 112 is any computer storage device or any non-transitory computer-readable medium with the sole exception of a transitory, propagating signal. In other words, the terms "memory" and "storage" as used herein refer to a non-transitory computer readable memory or a non-transitory computer readable storage. The memory 112 includes a non-volatile memory such as a flash memory, a hard disk, a ROM (Read Only Memory) device, and so on, for example. Also, for example, the memory 112 can also include volatile memory such as a RAM (Random Access Memory) device. The memory 112 can also be referred to as computer storage device 112.

The electronic controller 110 includes at least one processor employing a CPU. The electronic controller 110 can include a memory such as a built-in ROM (Read Only Memory), RAM (Random Access Memory) or the like. The electronic controller 110 executes processing by separating functions between a device controller 116 and an interpolation processor 118. The device controller 116 and the interpolation processor 118 can share the processor of the electronic controller 110, or each of the device controller 116 and the interpolation processor 118 can have its own processor. Here, the device controller 116 includes a first control circuit and the interpolation processor 118 includes a second control circuit, where the processor of the electronic controller 110 is shared between the first control circuit and the second control circuit.

The device controller 116 is configured to acquire input information related to traveling of the human-powered vehicle from the sensor 60. The device controller 116 is configured to control, according to the device control program 10P, the device 30 with control data decided based on output information obtained if the acquired input information is input to a first learning model 11M to be described later. The device controller 116 is configured to control actions of a control object that is mounted on the human-powered vehicle 1 as well as power supply to and communication with the control object based on the decided control data according to the device control program 10P.

The interpolation processor 118 is configured to execute processing of interpolating the first learning model 11M stored in the memory 112 using a second learning model trained with input information of a human-powered vehicle different in at least one of the human-powered vehicle 1 and the rider of the human-powered vehicle 1, according to an interpolation processing program 12P.

The electronic controller 110 is configured to execute processing under a different control state between a mode of automatic control of the device 30 by the function of the device controller 116 using the first learning model 11M to be described later and a learning mode of the first learning model 11M. The electronic controller 110 basically performs the processing of the learning mode based on an operation performed on the operation device 40 until the accuracy of the first learning model 11M reaches a certain level. When the accuracy of the first learning model 11M reaches the certain level, the electronic controller 110 interpolates the first learning model 11M by the interpolation processor 118 while basically performing the processing of the automatic control mode using the first learning model 11M.

Here, the memory 112 includes a non-volatile memory such as a flash memory, for example. The memory 112 stores the device control program 10P and the interpolation processing program 12P. The device control program 10P and the interpolation processing program 12P can be acquired by the electronic controller 110 reading out a device control program 90P and an interpolation processing program 92P stored in a non-transitory recording medium 900 and copying it onto the memory 112.

The memory 112 stores the first learning model 11M. The details of the first learning model 11M will be described below. The first learning model 11M can also be acquired by the electronic controller 110 reading out a first learning model 91M stored in the non-transitory recording medium 900 and copying it onto the memory 112.

The electronic controller 110 (including the device controller 116 and the interpolation processor 118) communicates with an object to be controlled. In this case, the electronic controller 110 can have its own communication device (not illustrated) intended for the control object, or the electronic controller 110 can be connected to a communication device intended for the control object provided inside the control device 10. The electronic controller 110 preferably has a connection device for communicating with the control object or the communication device.

The electronic controller 110 preferably communicates with the control object by at least one of the PLC communication and the CAN communication. Not limited to a wired communication, the communication with the control object performed by the electronic controller 110 can be a wireless communication such as ANT®, ANT+®, Bluetooth®, WiFi®, ZigBee®, or the like.

The electronic controller 110 is connected to the sensor 60 through a signal line. The electronic controller 110 acquires input information related to traveling of the human-powered vehicle 1 from a signal output by the sensor 60 through the signal line.

The electronic controller 110 can communicate with an information processing device 8 to be described later via a wireless communication device 114 having an antenna. The term "wireless communication device" as used herein refers to a hardware device capable of wirelessly transmitting and/or receiving a signal, and does not include a human being. The wireless communication device 114 can be integrated into the control device 100. The wireless communication device 114 is a device that implements communication over the so-called Internet. The wireless communication device 114 can be a device used for wireless communication such as ANT®, ANT+®, Bluetooth®, WiFi®, ZigBee®, Long Term Evolution (LTE), or the like. The wireless communication device 114 can be compliant with a communication network such as 3G, 4G, 5G, a Long Term Evolution (LTE), a Wide Area Network (WAN), a Local Area Network (LAN), an Internet line, a leased line, a satellite channel or the like.

The details of control performed by the control device 100 thus configured will be described. The electronic controller 110 of the control device 100 automatically controls the device 30 according to the device control program 10P by the function of the device controller 116 using control data decided based on output information obtained if the acquired input information is input to the first learning model 11M to be described later. In the first embodiment, the electronic controller 110 automatically controls the transmission device 31 by the device controller 116 based on the information obtained if the input information is input to the first learning model 11M.

Figure 3:
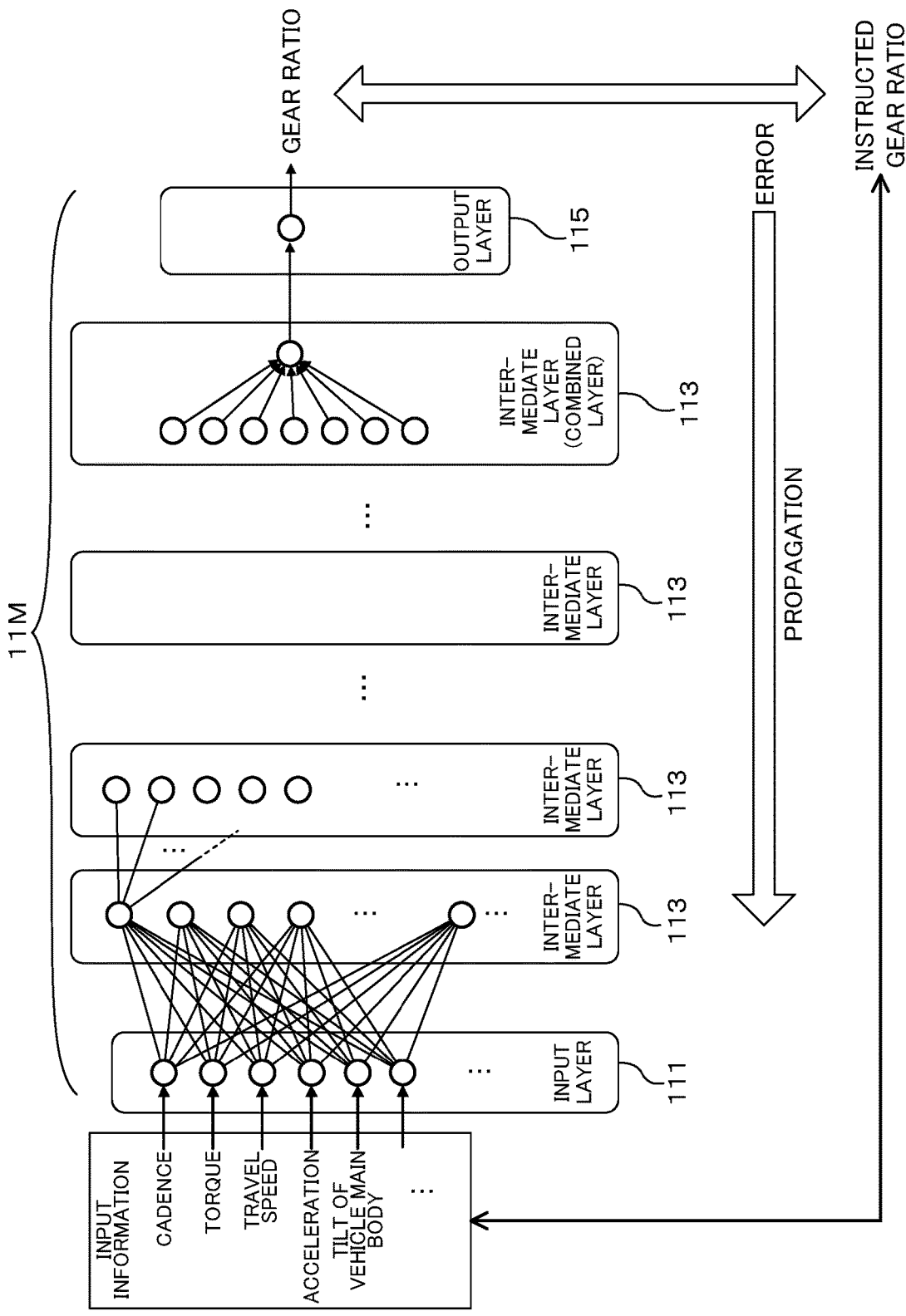
FIG. 3 illustrates one example of a first learning model.

FIG. 3 illustrates one example of the first learning model 11M. The first learning model 11M is a learning model trained by supervised deep learning using a Neural Network (hereinafter referred to as NN). The first learning model 11M can be a model trained by a Recurrent Neural Network (RNN). The first learning model 11M illustrated in FIG. 3 is trained so as to reproduce a gear ratio instructed to the transmission device 31 in the case where input information related to traveling of the human-powered vehicle 1 acquired from the sensor 60 is input.

The first learning model 11M includes an input layer 111 to which input information related to traveling of the human-powered vehicle 1 that is acquired from the sensor 60 is input. The first learning model 11M includes an output layer 115 from which output information related to control of the transmission device 31 of the human-powered vehicle 1 is output. The first learning model 11M includes an intermediate layer 113 that is located between the input layer 111 and the output layer 115, is formed by one or more layers each including a group of nodes, and is trained based on training data including an operation type accepted by the operation device 40 related to the output information. The nodes in the intermediate layer 113 each have a parameter including at least one of the weight and the bias associated with the node in the previous layer. The electronic controller 110 creates training data by labeling the corresponding input information with a gear ratio actually instructed to the transmission device 31 based on a part of the learning function of the interpolation processor 118. The electronic controller 110 inputs the created training data to the input layer 111 and trains parameters in the intermediate layer 113 so as to reduce the error between the gear ratio output from the output layer 115 and the gear ratio actually instructed by the rider. Thus, the first learning model 11M is trained so as to reproduce a gear ratio to be instructed to the transmission device 31 by the rider depending on a situation such as the speed and acceleration of the human-powered vehicle 1 and the type of a road, in response to the input information acquired from the sensor 60.

Figure 4:
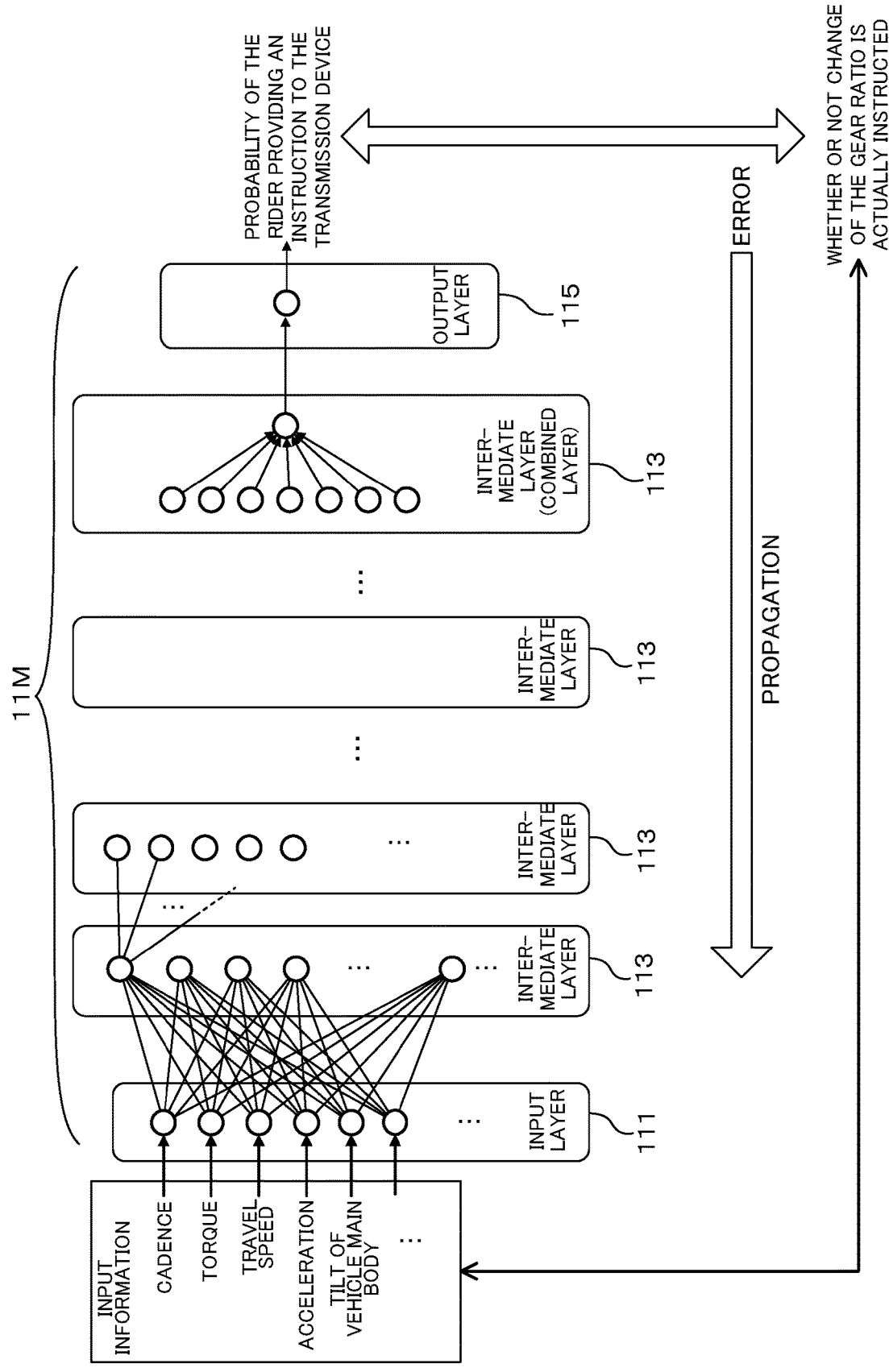
FIG. 4 illustrates another example of the first learning model.

FIG. 4 illustrates another example of the first learning model 11M. The first learning model 11M illustrated in FIG. 4 is a learning model trained by supervised deep learning using an NN as in the example illustrated in FIG. 3. The first learning model 11M is trained so as to output the probability of the rider providing an instruction to the transmission device 31 if input information related to the traveling of the human-powered vehicle 1 acquired from the sensor 60 is input.

The first learning model 11M includes an input layer 111, an intermediate layer 113 and an output layer 115. The first learning model 11M as another example creates training data by labeling the input information with whether or not change of the gear ratio is instructed to the transmission device 31. The electronic controller 110 inputs the created training data to the input layer 111 and trains the parameters in the intermediate layer 113 so as to reduce the error between the probability output from the output layer 115 and the result of whether or not change of the gear ratio is actually instructed. Thus, the first learning model 11M is trained so as to output the probability of providing an instruction to the transmission device 31 depending on the situation such as a speed or acceleration of the human-powered vehicle 1 or a road type, in response to the input information acquired from the sensor 60.

The device controller 116 of the human-powered vehicle 1 controls the transmission device 31 using the output information output from the first learning model 11M. In the case where the first learning model 11M illustrated in FIG. 3 is used, the electronic controller 110 can change gears with the transmission device 31 based on the gear ratio output from the first learning model 11M. In the case where the first learning model 11M illustrated in FIG. 4 is used, the electronic controller 110 can change the gear ratio of the transmission device 31 based on the probability output from the first learning model 11M.

Before shipment of the human-powered vehicle 1, the first learning model 11M has been trained by using general-purpose training data so as to output the output information as illustrated in FIG. 3 or FIG. 4 in response to the input information. After shipment of the human-powered vehicle 1, the control device 100 operates in the learning mode to allow the electronic controller 110 to advance the learning of the first learning model 11M according to the preferences and characteristics of the rider. Such learning is however insufficient that optimizes the control data with respect to the transmission device 31 for the rider in an environment where the human-powered vehicle 1 is not travelling. In the first embodiment, the control device 100 thus interpolates the first learning model 11M by the second learning model trained with input information for another human-powered vehicle different in at least one of the human-powered vehicle 1 and the rider of the human-powered vehicle 1.

The second learning model used for interpolation is a learning model trained for another human-powered vehicle 1 or another rider, and collected from the control device 100 corresponding to each human-powered vehicle 1 to the information processing device 8.

Figure 5:
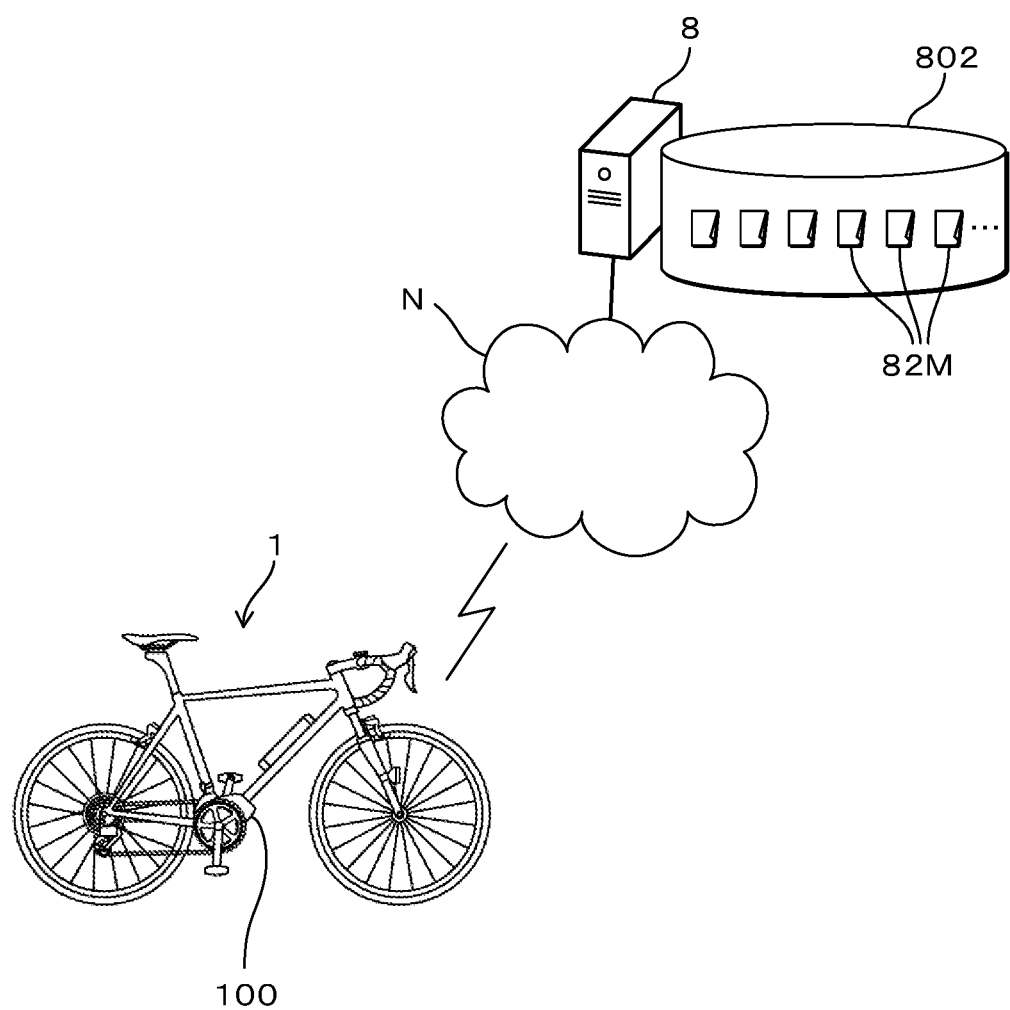
FIG. 5 illustrates the control device and an information processing device according to the first embodiment.

FIG. 5 illustrates the control device 100 and the information processing device 8 according to the first embodiment. The control device 100 according to the first embodiment is communicable with the information processing device 8 through a communication network N as illustrated in FIG. 5. The communication network N is composed of a communication line such as 3G, 4G, 5G, a Long Term Evolution (LTE), a Wide Area Network (WAN), a Local Area Network (LAN), an Internet line, a leased line, a satellite channel and communication equipment such as a base station. The control device 100 can employ an information terminal device 7 configured to be communicable with the information processing device 8 through the communication network N. The information terminal device 7 is, for example, a smartphone, a cycle computer or the like used by the rider of the human-powered vehicle 1. It can also function as a user interface for receiving an input of instructions from the rider or outputting information to the rider.

The information processing device 8 includes a memory 802 storing multiple second learning models 82M. The control device 100 can use any one of the multiple second learning models 82M through communication with the information processing device 8.

Figure 6:
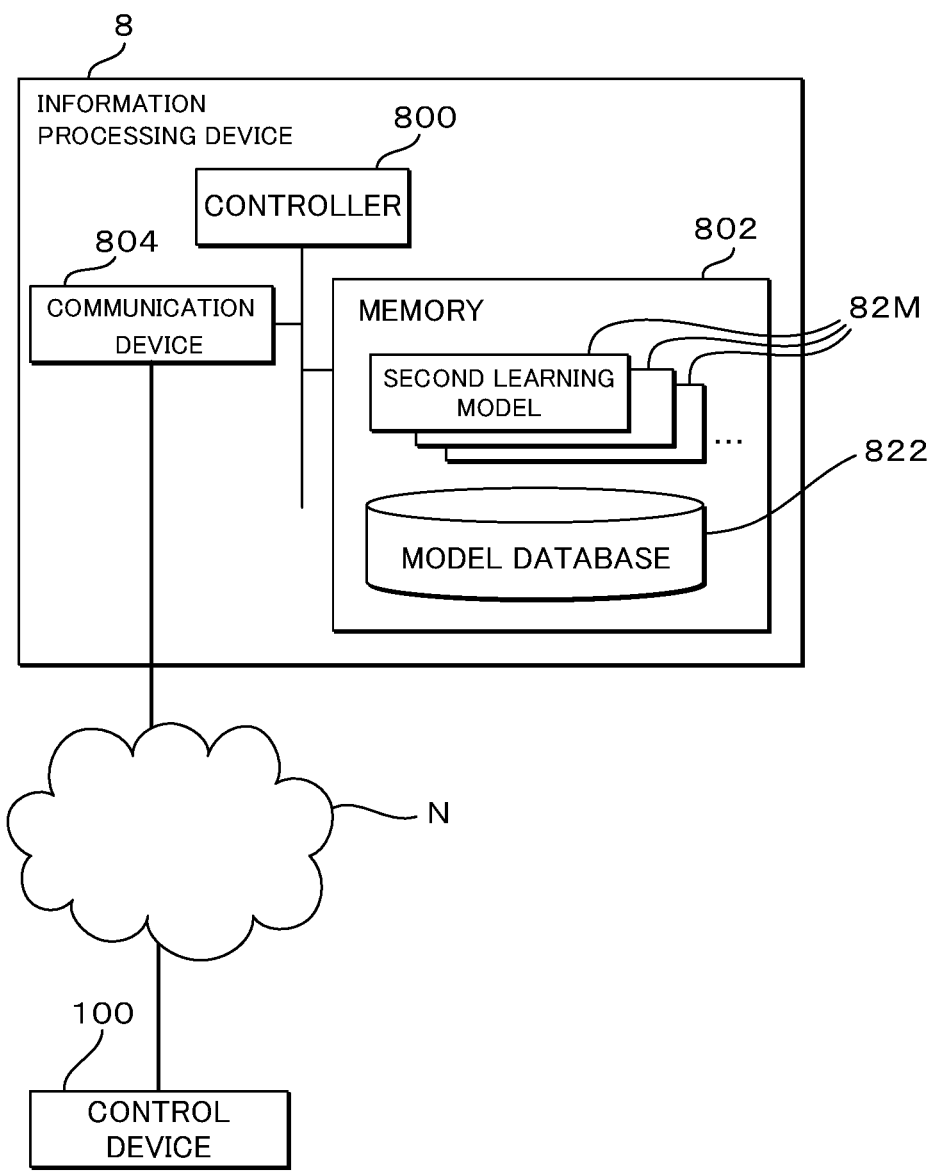
FIG. 6 is a block diagram illustrating the configuration of the information processing device.

FIG. 6 is a block diagram illustrating the configuration of the information processing device 8. The information processing device 8 is provided with an electronic controller 800, a memory 802 and a communication device 804.

The electronic controller 800 is at least one processor employing a CPU. The electronic controller 800 can employ a graphics processing unit (GPU). The electronic controller 800 can employ a CPU and a GPU. The electronic controller 800 can include a memory such as a built-in ROM or RAM or the like and transmits and receives data to and from the control device 100.

The electronic controller 800 can be one or more processing circuits including a Field Programmable Gate Array (FPGA), a Digital Signal Processor (DSP), a quantum processor, a volatile or non-volatile memory and the like.

The memory 802 is a bulk non-volatile memory such as a hard disk, a solid state drive (SSD) or the like. The memory 802 stores multiple second learning models 82M collected from respective human-powered vehicles 1 by associating the second learning models 82M with the model identification data that identifies the second learning models 82M from one another.

The memory 802 stores the model identification data of the second learning model 82M in association with the data that identifies at least one of the trained human-powered vehicle 1 and the rider of the trained human-powered vehicle 1. The memory 802 includes a model database 822 that stores the specification and type of the rider of the human-powered vehicle 1 in association with data that identifies at least one of the human-powered vehicle 1 and the rider. Thus, the electronic controller 800 can determine the input information for which the second learning model 82M is trained.

The communication device 804 is a communication device that communicates with the control device 100 through the network N. The term "communication device" as used herein refers to a hardware device capable of transmitting and/or receiving a signal, and does not include a human being. The communication device 804 adheres to the communication network such as 3G, 4G, 5G, an LTE, a WAN, a LAN, an Internet line, a leased line, a satellite channel or the like. The electronic controller 800 transmits and receives data to and from the control device 100 via the communication device 804.

With the control device 100 and the information processor 8 thus configured, the control device 100 controls the transmission device 31 using the first learning model 11M interpolated by the second learning model 82M.

Figure 7:
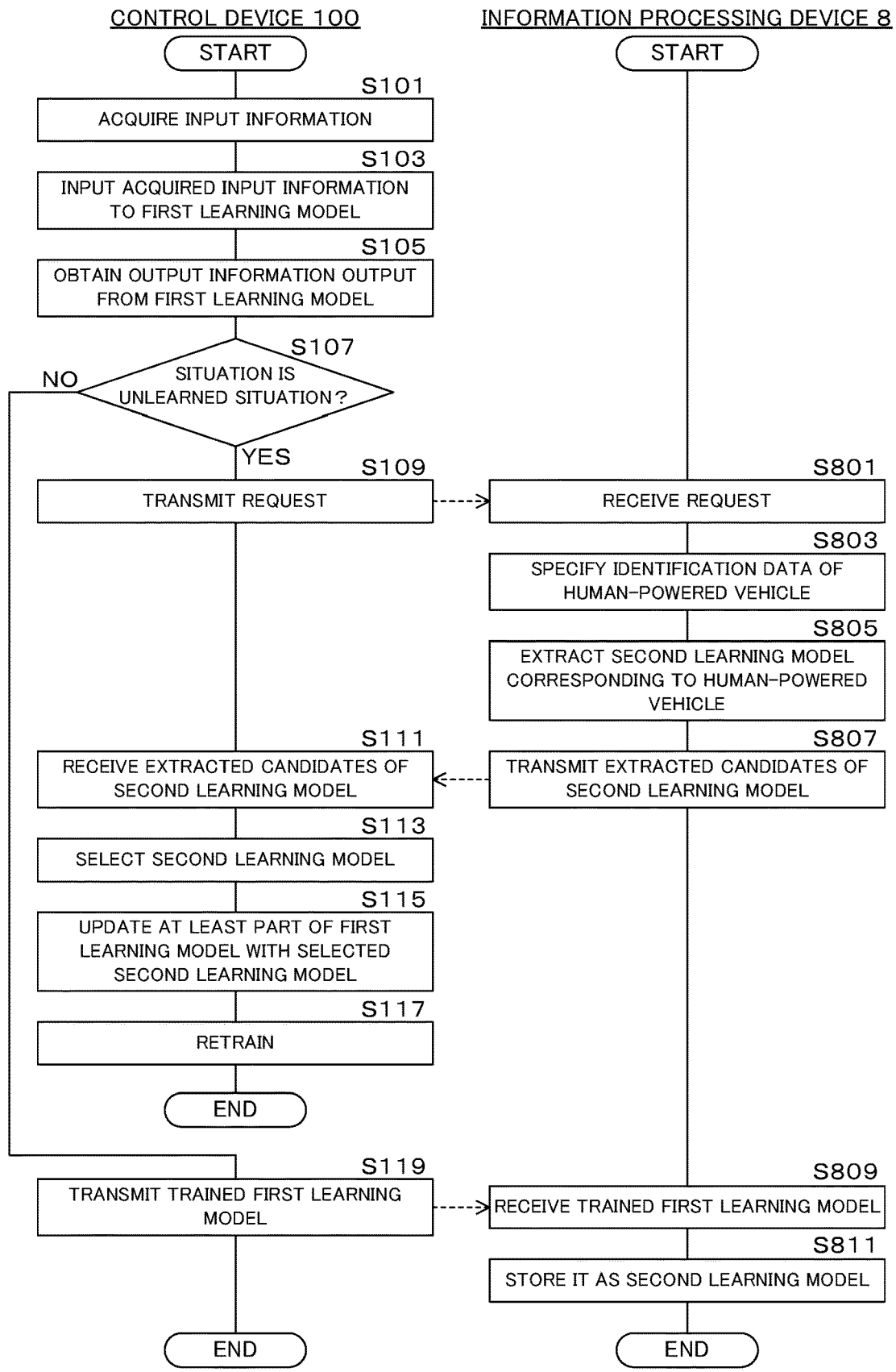
FIG. 7 is a flowchart showing one example of a learning method of the first learning model according to the first embodiment.

FIG. 7 is a flowchart showing one example of a learning method of the first learning model 11M according to the first embodiment. The control device 100 executes the following processing in the learning mode.

The electronic controller 110 of the control device 100 acquires input information related to traveling of the human-powered vehicle 1 from the sensor 60 (step S101). The electronic controller 110 performs the processing at step S101 at multiple time points during the traveling.

At step S101, the electronic controller 110 acquires data from at least one of the speed sensor 61, the acceleration sensor 62, the torque sensor 63, the cadence sensor 64, the gyro sensor 65, the seating sensor 66 and the camera 67.

The electronic controller 110 inputs the acquired input information related to traveling of the human-powered vehicle 1 to the first learning model 11M (step S103) and obtains output information output from the first learning model 11M (step S105).

The electronic controller 110 determines whether or not the situation is an unlearned situation based on the comparison between the output information obtained at step S105 and the operation type actually performed on the transmission designating member(s) 40B by the rider in accordance with the input information acquired at step S101 (step S107).

If the situation is determined to be an unlearned situation (S107: YES), the electronic controller 110 transmits a request for a second learning model 82M to the information processing device 8 by the wireless communication device 114 (step S109).

When the information processing device 8 receives the request for a second learning model 82M (step S801), the electronic controller 800 specifies the identification data of the human-powered vehicle 1 with the control device 100 having made a request (step S803).

From the multiple second learning models 82M stored in the information processing device 8, the electronic controller 800 extracts the second learning model 82M corresponding to a human-powered vehicle or a rider similar to at least one of the human-powered vehicle with the control device 100 having made the request and the rider of the human-powered vehicle (step S805).

As a first example, at step S805, the electronic controller 800 extracts the second learning model 82M, from the multiple second learning models 82M, that is trained in another human-powered vehicle 1 which is the same as or similar to, in at least one of the type and size, the human-powered vehicle 1 with the control device 100 having made the request. In the case where the type of the human-powered vehicle 1 mounted with the control device 100 having made the request is a mountain bike, for example, the electronic controller 800 extracts the second learning model 82 associated with the identification data of another human-powered vehicle 1 that is a mountain bike with reference to the model database 822.

As a second example, at step S805, the electronic controller 800 extracts the second learning model 82, from the multiple second learning models 82M that is trained in another human-powered vehicle 1 mounted with a device 30 which is the same as or similar to, in at least one of the type and manufacturer, the device 30 mounted on the human-powered vehicle 1 with the control device 100 having made the request. The device 30 can be at least one of the suspension 33, the seat post 35, the brake device 37 and the assist device 30 other than the transmission device 31. Referring to the model database 822, the electronic controller 800 extracts the second learning model 82M trained in a human-powered vehicle 1 which is the same or similar in at least one of the transmission device 31, the suspension 33, the seat post 35, the brake device 37 and the assist device 39.

As a third example, at step S805, the electronic controller 800 extracts the second learning model 82, from the multiple second learning models 82M, that is trained in a human-powered vehicle 1 of the rider of the same type as or a similar type to the rider of the human-powered vehicle 1 with the control device 100 having made the request. Referring to the model database 822, the electronic controller 800 extracts the second learning model 82M trained in a human-powered vehicle 1 ridden by the rider of a similar type based on the identification data of the rider categorized as a high cadence and high torque type, a high cadence and low torque type, a low cadence and high torque type and a low cadence and low torque type.

The electronic controller 800 can extract the multiple second learning models 82M using one of the methods in the first to third examples, or can extract the multiple second learning models 82M using a combination of two or three methods.

At step S805, the electronic controller 800 can sort the extracted multiple second learning models 82M by similarity to narrow down to a predetermined number of second learning models 82M. The similarity is so calculated, for example, that the more items are identical, the higher the similarity is.

The electronic controller 800 transmits the extracted candidates for the second learning model 82M to the control device 100 through the communication device 804 (step S807).

The electronic controller 110 receives from the information processing device 8 the multiple candidates for the second learning model 82M trained with the input information for another human-powered vehicle 1 different in at least one of the human-powered vehicle 1 and the rider (step S111). The electronic controller 110 selects a second learning model 82M from the multiple candidates (step S113).

As a first example, at step S113, the electronic controller 110 selects, among the multiple candidates, the second learning model 82 for which output information output in the case where the input information acquired at step S101 is input is most similar to the operation type actually performed on the transmission designating member(s) 40B by the rider.

As a second example, at step S113, the electronic controller 110 selects, among the multiple candidates, the second learning model 82 similar in control data decided by the device controller 116 among the output information obtained if the same input information is input to the multiple candidates for the second learning models 82. More specifically, the electronic controller 110 inputs the input information acquired at step S101 to the candidates for the second learning model 82M. The electronic controller 110 decides the control data which is most similar in the operation type actually performed on the transmission designating member(s) 40B by the rider among the control data decided by the device controller 116 based on the output information from the candidates for the second learning models 82M. The electronic controller 110 selects the second learning model 82 that outputs the output information that is the source of the control data.

As a third example, at step S113, the electronic controller 110 can select any one of the received multiple candidates.

The electronic controller 110 executes interpolation processing by updating at least part of the first learning model 11M with the second learning model 82M selected at step S113 (step S115). At step S115, the electronic controller 110 can replace the entire first learning model 11M with the selected second learning model 82M. At step S115, the electronic controller 110 can update part of the parameters of the first learning model 11M with the parameters of the selected second learning model 82M.

The electronic controller 110 retrains the interpolated first learning model 11M with the training data labeling the input information acquired at step S101 with the operation type actually performed on the transmission designating member(s) 40B by the rider (step S117) and ends the processing.

If determining that the situation is not an unlearned situation at step S107 (S107: NO), the electronic controller 110 transmits the trained first learning model 11M to the information processing device 8 through the wireless communication device 114 (step S119).

The information processing device 8 receives the trained first learning model 11M (step S809), stores it as the second learning model 82M in the memory 802 (step S811) and ends the processing.

The processing procedure of the flowchart in FIG. 7 can be executed at the end of each traveling based on the input information stored at step S101, not limited to during traveling of the human-powered vehicle 1. The first learning model 11M, which is determined to be untrained according to the processing procedure of the flowchart in FIG. 7, is interpolated by the second learning model 82M. This lowers the probability of being determined to be an unlearned situation at next step S107, and allows the use of the first learning model 11M for the automatic control even in the unlearned situation.

Figure 8:
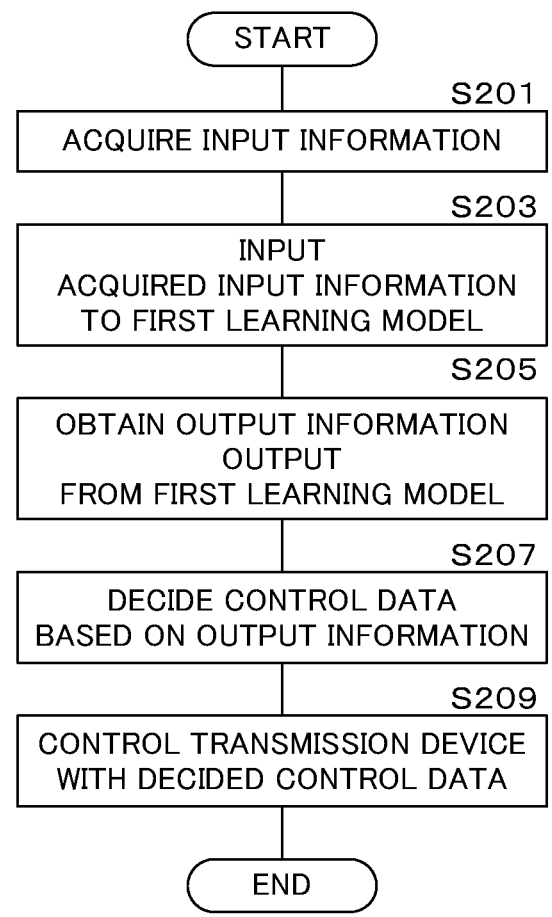
FIG. 8 is a flowchart showing one example of control processing using the first learning model according to the first embodiment.

FIG. 8 is a flowchart showing one example of the control processing using the first learning model 11M according to the first embodiment. The control device 100 repeatedly executes the following processing in the control mode.

The electronic controller 110 of the control device 100 acquires input information related to traveling of the human-powered vehicle 1 from the sensor 60 (step S201).

The electronic controller 110 inputs the acquired input information related to traveling of the human-powered vehicle 1 to the first learning model 11M (step S203) and obtains output information output from the first learning model 11M (step S205).

The electronic controller 110 decides control data of the transmission device 31 by the device controller 116 based on the output information obtained at step S205 (step S207). At step S207, the electronic controller 110 can decide the gear ratio itself or decide whether to change gears or not.

The electronic controller 110 controls the transmission device 31 with the decided control data (step S209) and ends the processing. The electronic controller 110 repeatedly performs the processing at steps S201 to S209.

According to the processing by the control device 100 of the first embodiment, training of the first learning model 11M can be advanced using the second learning model 82M even for the unlearned traveling situation, which reduces the time required for training. The processing performed by the electronic controller 110 allows interpolation of the first learning model 11M using the second learning model 82M even for the unlearned traveling situations, so that automatic control can be achieved even in the unlearned situation.

Second Embodiment

In a second embodiment, the suspension 33, the seat post 35, the brake device 37 and the assist device 39 other than the transmission device 31 are also assumed as objects to be controlled. In the second embodiment, an object to be controlled based on the first learning model 11M can be at least one of the transmission device 31, the suspension 33, the seat post 35, the brake device 37 and the assist device 39.

Figure 9:
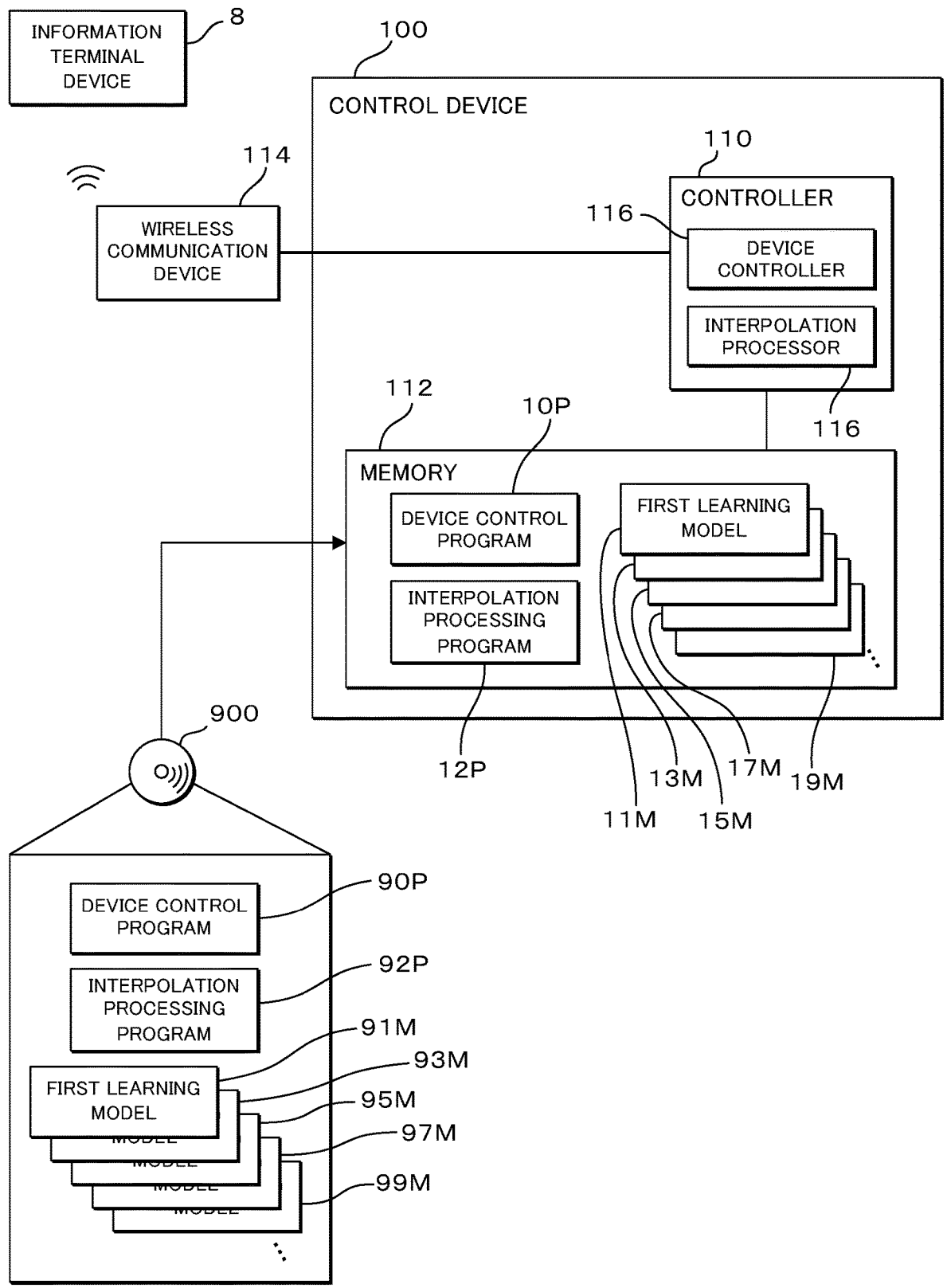
FIG. 9 is a block diagram illustrating the configuration of a control device according to a second embodiment.

In the second embodiment, the first learning model 11M is separately trained for each control object. FIG. 9 is a block diagram illustrating the configuration of the control device 100 according to the second embodiment. FIG. 9 illustrates the configuration of only the control device 100 and does not illustrate the device 30, the operation device 40 and the sensor 60 that are connected to the control device 100.

The memory 112 of the control device 100 stores a first learning model 11M used for control of the transmission device 31 and a first learning model 13M used for control of the suspension 33. The memory 112 also stores a first learning model 15M used for control of the seat post 35, a first learning model 17M used for control of the brake device 37 and a first learning model 19M used for control of the assist device 39.

The first learning models 11M, 13M, 15M, 17M and 19M can respectively be copied from first learning models 91M, 93M, 95M 97M and 99M stored in a non-transitory recording medium 900.

Figure 10:
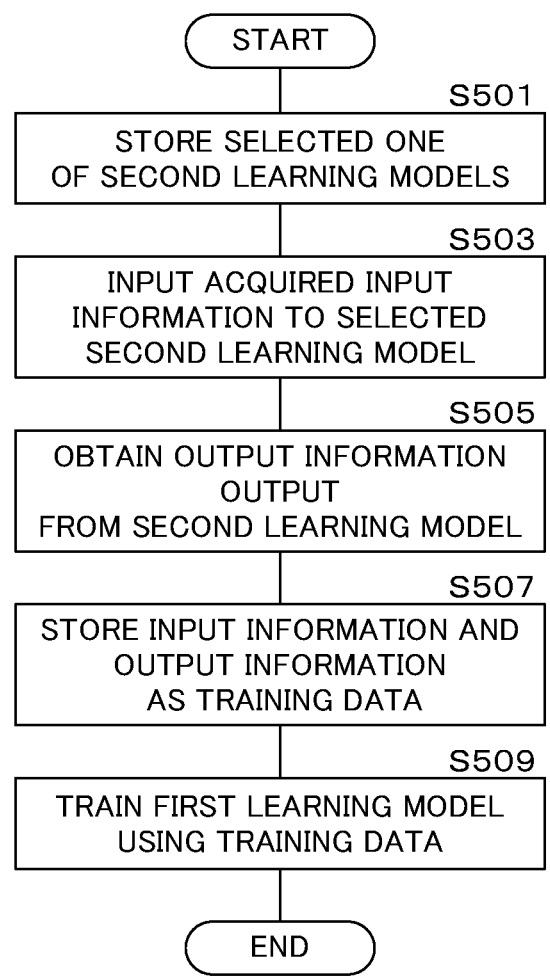
FIG. 10 is a flowchart showing one example of a learning method of the first learning model according to a third embodiment.

The electronic controller 110 of the control device 10 according to the second embodiment performs for each device 30 the processing procedures shown in the flowcharts of FIGS. 8 and 10 as performed on the transmission device 31 as a target in the first embodiment.

Thus, the control device 100 advances the learning of the first learning models 11M, 13M, 15M, 17M and 19M by means of the second learning model 82M regarding at least one of the suspension 33, the seat post 35, the brake device 37 and the assist device 39 as a target, respectively, even for an unlearned traveling situation. Thus, the time required for learning can be shortened for any device 30.

Third Embodiment

In the third embodiment, the learning method employed in the case where the unlearned situation is determined is different. The configuration of the control device 100 according to the third embodiment is similar to that of the first embodiment except for the details of the processing procedure of the learning method to be described below. The parts common to the first embodiment in the configuration of the control device 100 according to the third embodiment are denoted by similar reference codes and detailed description thereof will not be repeated.

FIG. 10 is a flowchart showing one example of a learning method of the first learning model 11M according to the third embodiment. The electronic controller 110 executes the processing procedure of the flowchart in FIG. 7 demonstrated in the first embodiment. The electronic controller 110 receives the multiple second learning models 82M (S111), selects any one of them (step S113), and interpolates the first learning model 11M as described below.

The electronic controller 110 stores the selected one of the second learning models 82M in the memory 112 (step S501). The electronic controller 110 inputs the input information that is acquired and stored at step S101 to the selected second learning model 82M (step S503). The electronic controller 110 acquires output information output from the second learning model 82M (step S505).

The electronic controller 110 stores the input information associated with the output information as training data (step S507). The electronic controller 110 trains the first learning model 11M using the stored training data (step S509) and ends the learning processing.

In the third embodiment, the control device 100 trains the first learning model 11M using as training data the input information acquired by the electronic controller 110 and the output information that is output in the case here the input information is input to the second learning model 82M as demonstrated in FIG. 10.

Even in the situation where learning is insufficient in the control device 100 of the human-powered vehicle 1, control can be made using the trained second learning model 82M, and training data created using the second learning model 82M can be used for training the first learning model 11M. This makes it possible to shorten the time required for training the unlearned situation.

Fourth Embodiment

The configuration of the control device 100 according to the fourth embodiment is similar to that of the control device 100 according to the first embodiment except for the configuration of the first learning model 11M and the details of the processing procedure using the first learning model 11M. The parts common to the first embodiment in the configuration of the control device 100 according to the fourth embodiment are denoted by similar reference codes and detailed description thereof will not be repeated.

Figure 11:
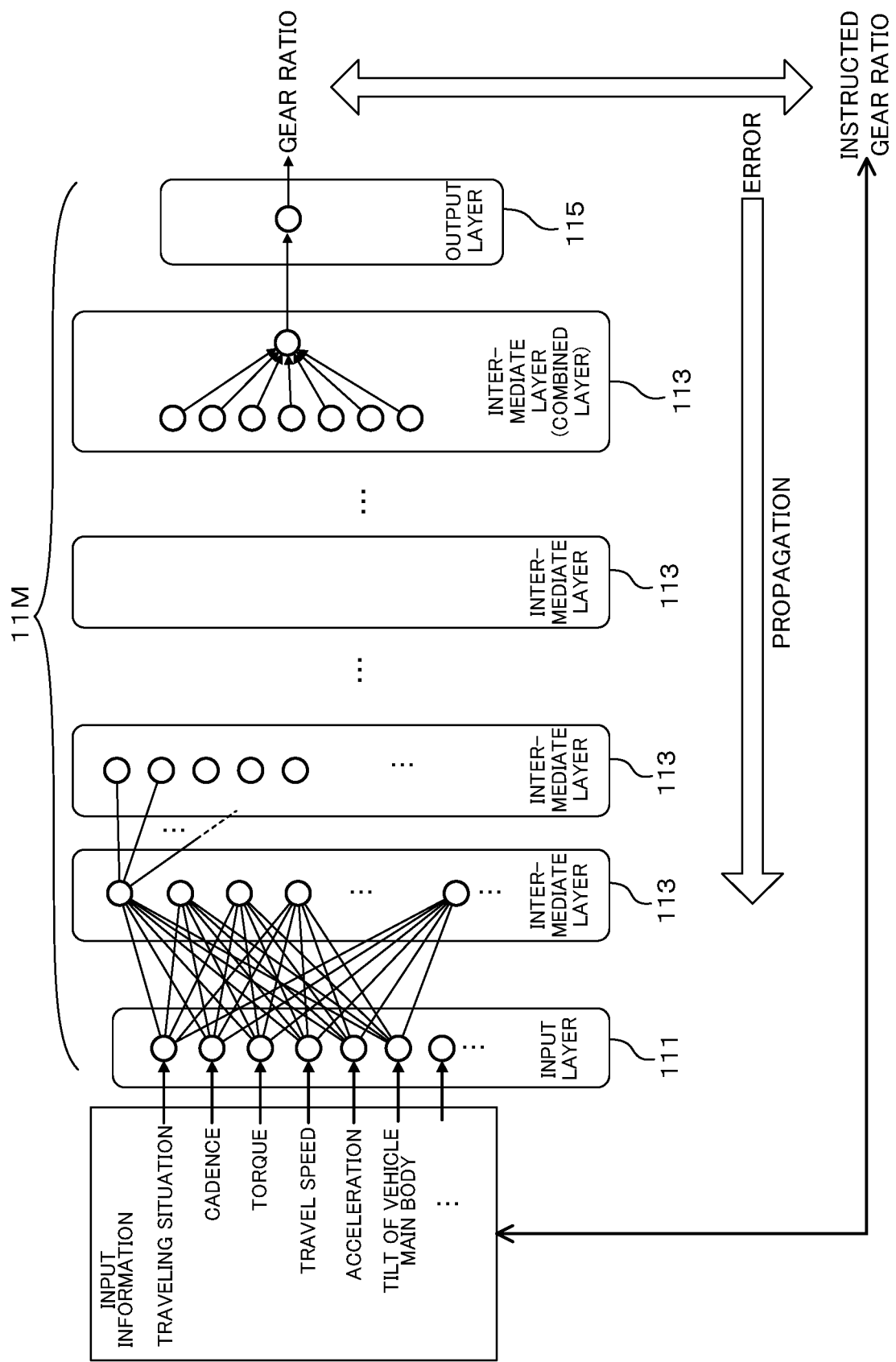
FIG. 11 is a schematic diagram of the first learning model according to a fourth embodiment.

FIG. 11 is a schematic diagram of the first learning model 11M according to the fourth embodiment. The first learning model 11M according to the fourth embodiment is also a learning model trained by supervised deep learning using an NN. The first learning model 11M according to the fourth embodiment is trained with input information acquired in multiple traveling situations different from each other. The traveling situation is distinguished by at least one of on-road, off-road and urban district situations. The traveling situation is distinguished by at least one of uphill, flat and downhill situations. In the following descriptions, the traveling situation is distinguished by nine traveling situations of being on-road and uphill, of being on-road and flat, of being on-road and downhill, of being off-road and uphill, of being off-road and flat, of being off-road and downhill, of being in an urban district and uphill, of being in an urban district and flat and being in an urban district and downhill. The traveling situation is not limited to being distinguished by nine. The traveling situation is not limited to the above distinctions. The traveling situation can be distinguished by a speed up or down related traveling situation such as when starting, when accelerated, when decelerated, and when stopped. The traveling situation can be distinguished by a road shape related traveling situation, for example, when traveling straight ahead, when entering a curve, when exiting a curve, when entering an intersection, and when entering a road with reduced width. The traveling situation can be distinguished by an another vehicle related traveling situation, for example, when finding no vehicle around, when approached by a car from behind, when traveling together with another human-powered vehicle and when passing on another human-powered vehicle.

The first learning model 11M includes an input layer 111 to which input information related to traveling of the human-powered vehicle 1 acquired from the sensor 60 and data indicating the situation are input. The rest of the configuration is similar to that of the first learning model 11M described in the first embodiment. In the following description, the first learning model 11M is trained so as to reproduce a gear ratio to be instructed to the transmission device 31 as one of the device 30 if input information related to traveling of the human-powered vehicle 1 acquired from the sensor 60 and data indicating the traveling situation are input.

In the fourth embodiment, the electronic controller 110 creates training data by labeling the corresponding input information with the gear ratio actually instructed to the transmission device 31 based on a part of the learning function of the interpolation processor 118. The electronic controller 110 trains the parameters in the intermediate layer 113 so as to reduce an error between the gear ratio output from the output layer 115 if the created training data and the traveling situation identified based on the information acquired from the sensor 60 are input to the input layer 111 and the gear ratio actually instructed by the rider. Thus, the first learning model 11M can be trained so as to reproduce, in response to the input information acquired from the sensor 60, a gear ratio to be instructed to the transmission device 31 by the rider depending on the traveling situation of the human-powered vehicle 1 and the speed, acceleration and the like in this traveling situation.

The first learning model 11M in FIG. 11 outputs a numerical value of the control data of the transmission device 31 as output information for control of the device 30. In the fourth embodiment as well, the output layer 115 of the first learning model 11M can output the probability of provision of an instruction to the transmission device 31. In this case, the intermediate layer 113 is trained so as to output the probability of the rider instructing the transmission device 31 to change gears depending on the traveling situation.

In the fourth embodiment, the first learning models 11M, which are trained in each control device 100, are also collected and stored in the information processing device 8.

Figure 12:
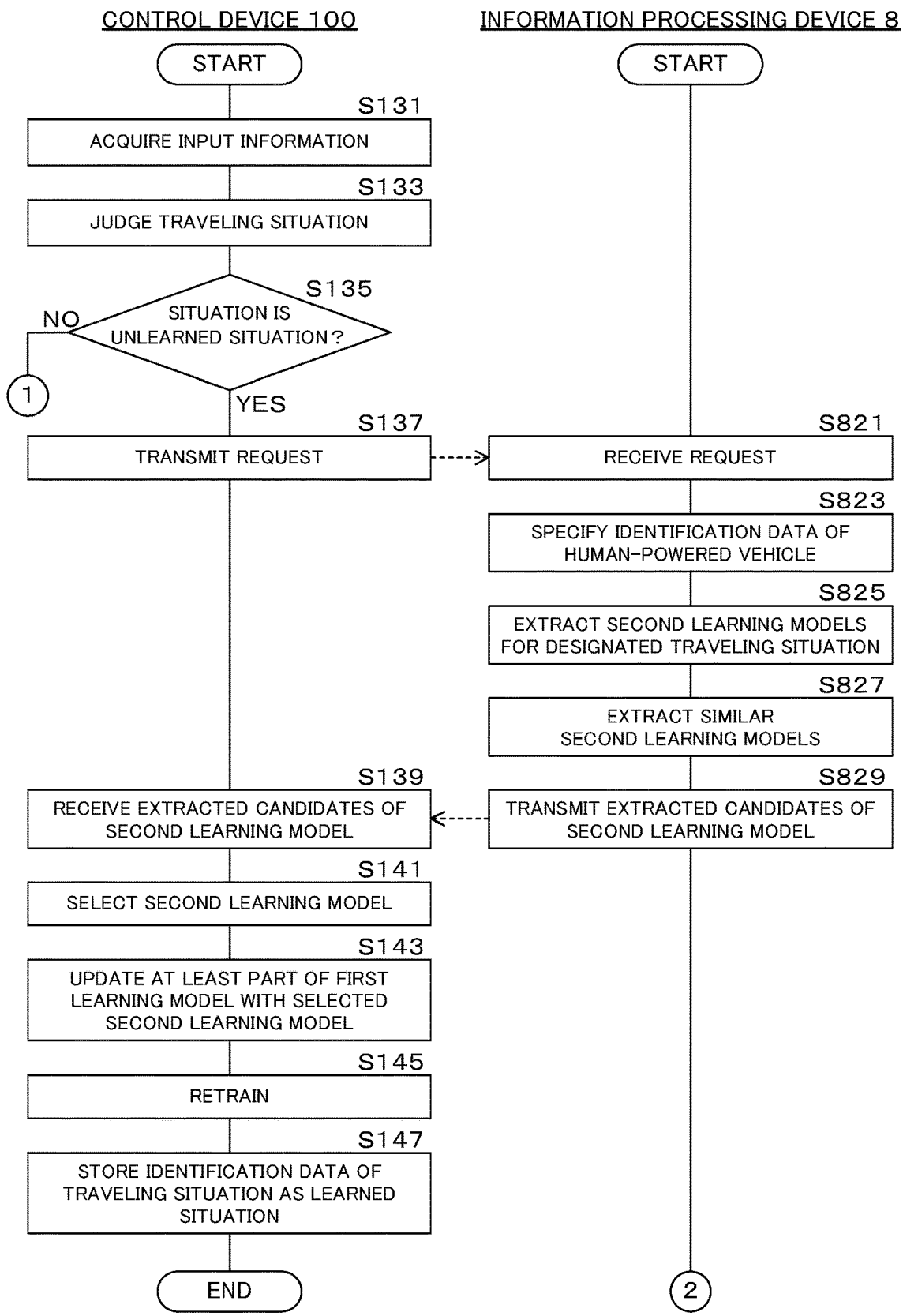
FIG. 12 is a flowchart showing one example of a learning method of the first learning model according to the fourth embodiment.
Figure 13:
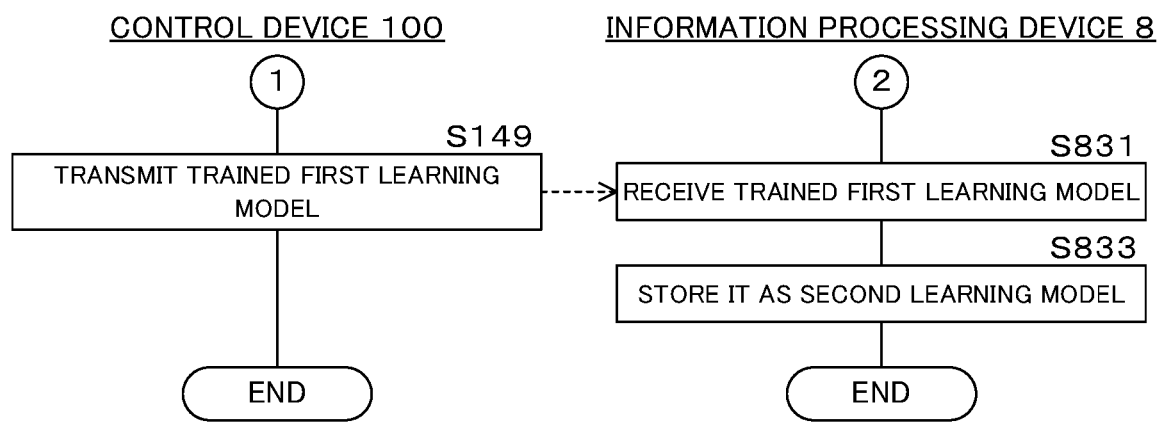
FIG. 13 is a flowchart showing one example of the learning method of the first learning model according to the fourth embodiment.

FIGS. 12 and 13 are each a flowchart showing one example of a learning method of the first learning model 11M according to the fourth embodiment. The control device 100 executes the following processing in the learning mode.

The electronic controller 110 of the control device 100 acquires input information related to traveling of the human-powered vehicle 1 from the sensor 60 and stores the information (step S131). At step S131, the electronic controller 110 acquires data from at least one of the speed sensor 61, the acceleration sensor 62, the torque sensor 63, the cadence sensor 64, the gyro sensor 65, the seating sensor 66 and the camera 67.

The electronic controller 110 judges the traveling situation based on the input information acquired from the sensor 60 (S133).

At step S133, the electronic controller 110 judges the traveling situation based on the information acquired from at least one of the speed sensor 61, the acceleration sensor 62, the torque sensor 63, the cadence sensor 64, the gyro sensor 65, the seating sensor 66, the camera 67 and the position information sensor 68. As a first example, the electronic controller 110 judges whether or not the road on which the human-powered vehicle 1 is traveling is off-road, an urban district or on-road based on the information related to the position of the human-powered vehicle 1 acquired from the position information sensor 68 and the map information possessed in advance by the human-powered vehicle 1. In the first example, the electronic controller 110 can be configured to acquire map information from the outside by communication. As a second example, the electronic controller 110 judges whether or not the road on which the human-powered vehicle 1 is traveling is off-road, an urban district or on-road based on the information related to the vibration of the human-powered vehicle 1 acquired from the acceleration sensor 62 and the attitude of the human-powered vehicle 1 acquired from the gyro sensor 65. In the second example, the electronic controller 110 can identify the traveling situation as being off-road if the frequency of vibration greater than a predetermined value is higher than a predetermined frequency. As a third example, the electronic controller 110 can identify the traveling situation as being off-road if the frequency of traveling in an unseated state is higher than a predetermined frequency. As a fourth example, the electronic controller 110 can identify the traveling situation as being an urban district if the number of repetitions of stops and starts is greater than a predetermined number of times relative to the travel distance. As a fifth example, the electronic controller 110 can identify the traveling situation as being on-road if the torque and cadence are constant. As a sixth example, the electronic controller 110 can identify the traveling situation as being on-road if the situation is neither off-road nor an urban district.

At step S133, the electronic controller 110 can identify whether or not the traveling situation is uphill, downhill or flat depending on the tilt in the pitch direction of the human-powered vehicle 1 by the gyro sensor 65.

The electronic controller 110 determines whether or not the traveling situation judged at step S133 is an unlearned traveling situation (step S135). At step S135, the electronic controller 110 determines whether or not the traveling situation is an unlearned traveling situation based on the information indicating the learned situation that is stored by being associated with the data identifying the traveling situation in the memory 112.

If the traveling situation is determined as an unlearned traveling situation (S135: YES), the electronic controller 110 transmits a request for a second learning model 82M to the information processing device 8 through the wireless communication device 114 (step S137). At step S137, the electronic controller 110 transmits the request while designating the data for identifying the judged traveling situation.

When the information processing device 8 receives the request for a second learning model 82M (step S821), the electronic controller 800 specifies the identification data of the human-powered vehicle 1 with the control device 100 having made the request (step S823).

The electronic controller 800 extracts the second learning models 82M trained for the traveling situation that is designated in the request from the multiple second learning models 82 stored in the information processing device 8 (step S825). Among the extracted second learning models 82M, the electronic controller 800 selects as candidates the second learning models 82M corresponding to a human-powered vehicle or a rider similar to at least one of the human-powered vehicle with the control device 100 having made a request and the rider of the human-powered vehicle (step S827).

At step S827, the electronic controller 800 can select at least one of the methods in the first to third examples described at step S805 in the processing procedure of the flowchart in FIG. 7 according to the first embodiment.

The electronic controller 800 transmits the selected candidates for the second learning models 82M to the control device 100 through the communication device 804 (step S829).

The electronic controller 110 receives from the information processing device 8 the multiple candidates for the second learning models 82M trained with the input information for other human-powered vehicles 1 different in at least one of the human-powered vehicle 1 and the rider (step S139). The electronic controller 110 selects a second learning model 82M from the multiple candidates (step S141).

At step S141, as a first example, the electronic controller 110 selects, among the multiple candidates, the second learning model 82M for which output information output if the input information acquired at step S101 is input is most similar to the operation type actually performed on the transmission designating member(s) 40B by the rider.

At step S141, as a second example, the electronic controller 110 selects, among the multiple candidates, the second learning model 82M for which the output information output if input information acquired in another traveling situation having been trained by the first learning model 11M and stored is input is similar to the output information output if input information is input to the first learning model 11M.

At step S141, as a third example, the electronic controller 110 selects, from the multiple candidates, the second learning model 82M for which the control data decided by the device controller 116 based on the output information obtained if the same input information is input is similar. More specifically, the electronic controller 110 inputs the input information acquired at step S131 to the candidates for the second learning models 82M. The electronic controller 110 decides, out of the control data decided by the device controller 116 based on the output information output from the second learning models 82M, control data which is most similar to the operation type actually performed on the transmission designating member(s) 40B by the rider. The electronic controller 110 selects the second learning model 82 that outputs output information that is the source of the decided control data.

At step S141, as a fourth example, the electronic controller 110 employs, among the multiple candidates, the second learning model 82M for which the control data decided by the device controller 116 based on the output information obtained if the input information acquired in another learned traveling situation is input is similar. More specifically, the electronic controller 110 inputs input information that is acquired and stored in another learned traveling situation and data identifying its traveling situation to candidates for the second learning model 82M. The electronic controller 110 inputs the stored input information and the data for identifying the traveling situation to the trained first learning model 11M. The electronic controller 110 acquires control data decided by the device controller 116 based on the output information obtained from the first learning model 11M in the trained traveling situation. This control data is not used for control. The electronic controller 110 acquires control data decided by the device controller 116 based on the output information output from the candidates for the second learning model 82M. The electronic controller 110 selects, among the candidates for the second learning models 82, the second learning model 82M that outputs the output information that is the source of the control data similar to the control data decided based on the output information from the first learning model 11M.

At step S141, as a fifth example, the electronic controller 110 can select any one of the received multiple candidates.

The electronic controller 110 performs the interpolation processing by updating at least part of the first learning model 11M with the second learning model 82M selected at step S141 (step S143). At step S143, the electronic controller 110 performs training using the output information obtained from the second learning model 82 as training data according to the procedure described in the third embodiment. At step S143, the electronic controller 110 can replace the entire first learning model 11M with the selected second learning model 82M. At step S143, the electronic controller 110 can update part of the parameters of the first learning model 11M with the parameters of the selected second learning model 82M.

The electronic controller 110 retrains the interpolated first learning model 11M with the training data labeling the input information acquired at step S131 with the corresponding operation type actually instructed to the transmission designating member(s) 40B by the rider (step S145). The electronic controller 110 stores the learned situation in the memory 112 in association with the data for identifying the traveling situation judged at step S133 (step S147).

If determining that the traveling situation is not an unlearned traveling situation at step S135 (S135: NO), the electronic controller 110 transmits the trained first learning model 11M together with the data for identifying the traveling situation to the information processing device 8 thorough the wireless communication device 114 (step S149).

The information processing device 8 receives the trained first learning model 11M (step S831), stores it together with the data identifying the traveling situation as the second learning model 82M in the memory 802 (step S833) and ends the processing.

The processing procedure of the flowchart in FIGS. 12 and 13 can be executed at the end of each traveling based on the input information stored at step S131, not limited to during traveling of the human-powered vehicle 1. With the processing procedure of the flowcharts in FIGS. 12 and 13, the first learning model 11M is interpolated by the second learning model 82M for an unlearned traveling situation. This lowers the probability of being determined to be an unlearned situation at next step S107, and allows the use of the first learning model 11M for the automatic control even in the unlearned situation.

Figure 14:
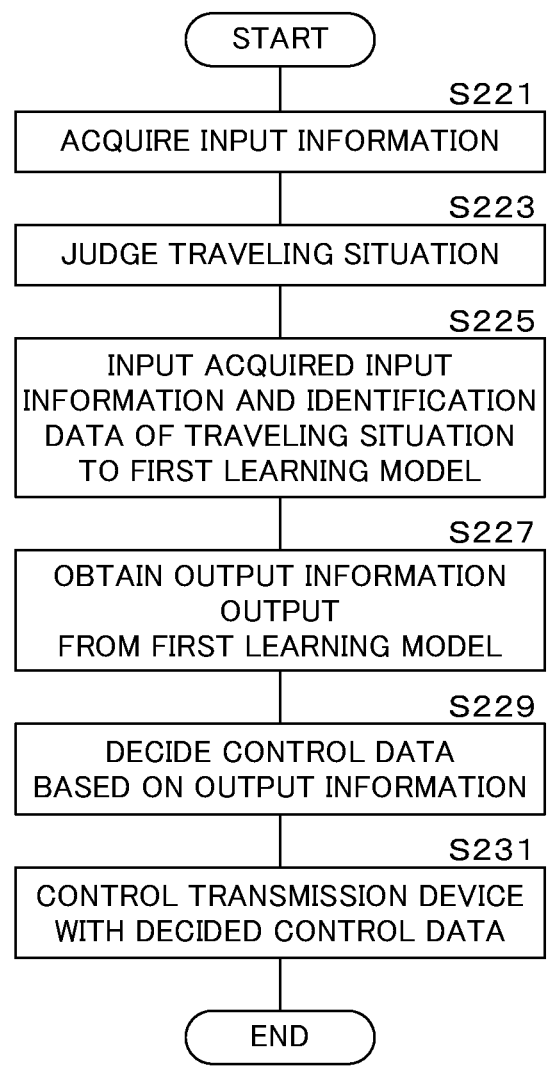
FIG. 14 is a flowchart showing one example of control processing of the first learning model according to the fourth embodiment.

FIG. 14 is a flowchart showing one example of control processing of the first learning model 11M according to the fourth embodiment. The control device 100 repeatedly executes the following processing in the control mode.

The electronic controller 110 of the control device 100 acquires input information related to traveling of the human-powered vehicle 1 from the sensor 60 (step S221). The electronic controller 110 judges the traveling situation based on the input information acquired from the sensor 60 (step S223).

The electronic controller 110 inputs the acquired input information related to traveling of the human-powered vehicle 1 and data for identifying the judged traveling situation to the first learning model 11M (step S225). The electronic controller 110 obtains the output information output from the first learning model 11M (step S227).

The electronic controller 110 decides the control data of the transmission device 31 by the device controller 116 based on the output information obtained at step S227 (step S229). At step S229, the electronic controller 110 can decide the gear ratio itself or decide whether to change gears or not.

The electronic controller 110 controls the transmission device 31 with the decided control data (step S231) and ends the processing. The electronic controller 110 repeatedly executes the processing at steps S221 to 231.

If there is an intervention operation by the rider with the control device 10 after the control at step S231, the electronic controller 110 restores that the target traveling situation is an unlearned situation and can perform the processing procedure of the flowcharts in FIGS. 12 and 13. In this case, the electronic controller 110 retrains the first learning model 11M interpolated by the second learning model 82M using the training data including the input information acquired from the sensor 60 of the human-powered vehicle 1, data for identifying the traveling situation and the operation instructed from the rider.

According to the processing performed by the control device 100 of the fourth embodiment, the learning time can be shortened for the first learning model 11M from which output information related to control data can appropriately be obtained, depending on whether the situation is an unlearned traveling situation or not.

Fifth Embodiment

The configuration of the control device 100 according to the fifth embodiment is similar to that of the control device 100 of the first embodiment except for the configuration of the first learning model 11M and the details of the processing procedure using the first learning model 11M. The parts common to the first embodiment in the configuration of the control device 100 according to the fifth embodiment are denoted by similar reference codes and detailed description thereof will not be repeated.

FIG. 15 illustrates a first learning model 11M according to the fifth embodiment. In the fifth embodiment, the first learning model 11M includes multiple learning models 11MA, 11MB . . . stored for each traveling situation. The learning models 11MA, 11MB, 11MC, . . . are each a learning model that includes the input layer, the output layer and the intermediate layer as configured in FIG. 3 or 4 of the first embodiment. The detailed description of the input layer, output layer and intermediate layer will not be repeated here.

The learning models 11MA, 11MB, 11MC, . . . are trained for each traveling situation so as to output the control data for the device 30 if input information on the traveling of the human-powered vehicle 1 acquired from the sensor 60 is input. As illustrated in FIG. 14, in the fifth embodiment, the traveling situation is distinguished by at least one of the on-road, off-road and urban district situations and is distinguished by at least one of uphill, flat and downhill situations. In the following descriptions, the traveling situation is distinguished by nine traveling situations of being on-road and uphill, of being on-road and flat, of being on-road and downhill, of being off-road and uphill, of being off-road and flat, of being off-road and downhill, of being in an urban district and uphill, of being in an urban district and flat and being in an urban district and downhill.

For example, the learning model 11MA is trained using training data including input information acquired from the sensor 60 of the human-powered vehicle 1 that is traveling in the on-road and uphill traveling situation and an operation type instructed by the rider. The learning model 11MB is trained using training data including input information acquired from the sensor 60 of the human-powered vehicle 1 that is traveling in the on-road and flat traveling situation and an operation type instructed by the rider. Likewise, the learning model 11MC is trained using training data including input information acquired from the sensor 60 of the human-powered vehicle 1 that is traveling in the on-road and downhill traveling situation and an operation type instructed by the rider. The learning models 11MD, 11ME, 11MF, 11MG, 11MH and 11MI are respectively trained for the off-road and uphill situation, the off-road and flat situation, the off-road and downhill situation, the urban district and uphill situation, the urban district and flat situation and the urban district and downhill situation.

The processing will be described below that is performed by the control device 100 using the first learning model 11M including multiple learning models trained for each traveling situation as mentioned above.

Figure 16:
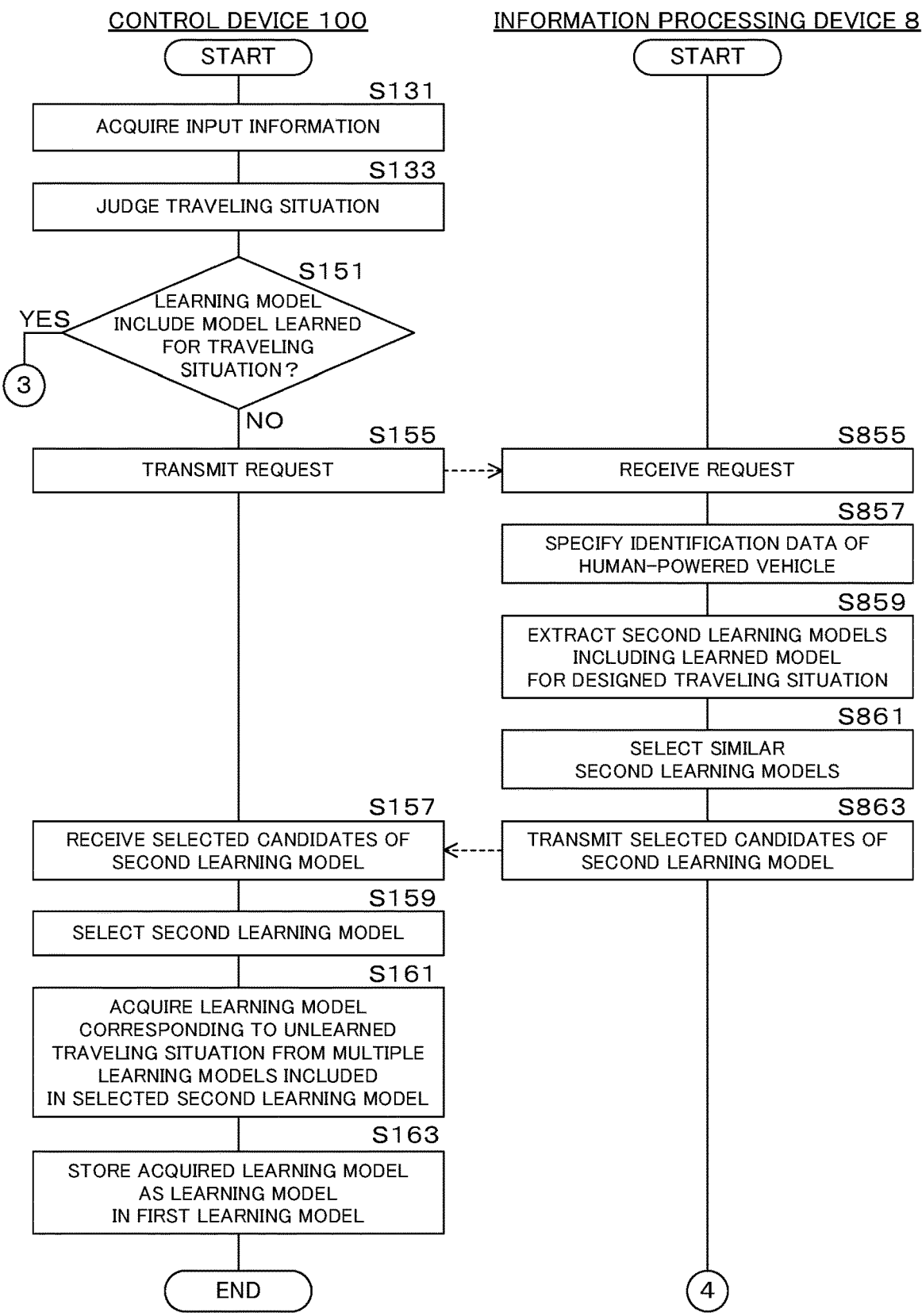
FIG. 16 is a flowchart showing one example of a learning method of the first learning model according to the fifth embodiment.
Figure 17:
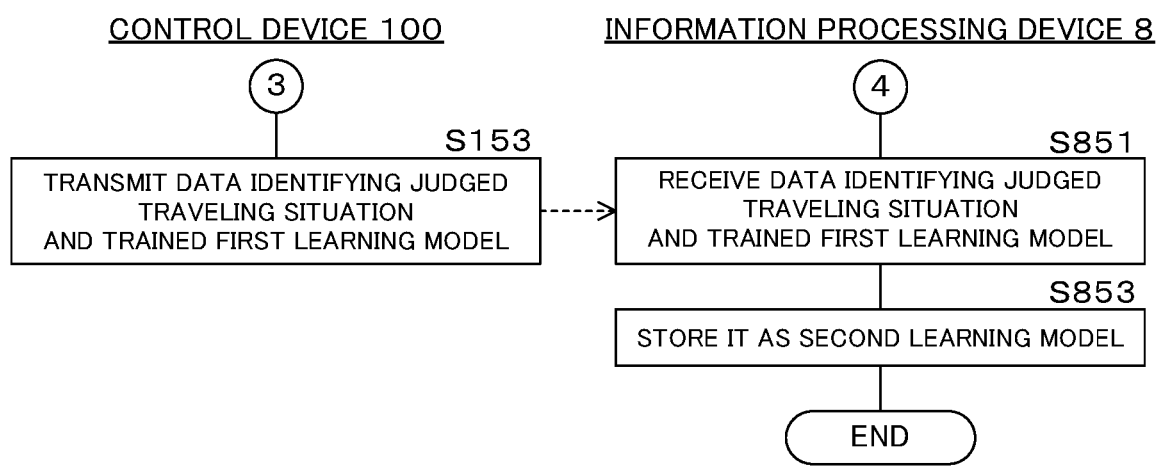
FIG. 17 is a flowchart showing one example of the learning method of the first learning model according to the fifth embodiment.

FIGS. 16 and 17 are each a flowchart showing one example of a learning method of the first learning model 11M according to the fifth embodiment. Among the processing procedure described in the flowchart of FIGS. 16 and 17, procedures common to those described in the flowchart of FIGS. 12 and 13 in the fourth embodiment are denoted by similar reference codes and detailed description thereof will not be repeated.

The electronic controller 110 acquires and stores input information (S131) and judges the traveling situation (S133).

The electronic controller 110 determines whether or not the trained first learning model 11M stored in the memory 112 includes the learning model 11MA, 11MB, . . . trained for the traveling situation identified at step S133 (step S151).

If it is determined that the first learning model 11M includes the learning model 11MA, 11MB, . . . trained for the identified traveling situation (S151: YES), the electronic controller 110 executes the processing at step S153. The electronic controller 110 transmits data for identifying the judged traveling situation and the learning model 11MA, 11MB, . . . trained for the judged traveling situation to the information processing device 8 thorough the wireless communication device 114 (step S153).

The information processing device 8 receives the data identifying the judged situation and the first learning model 11M trained for the judged situation (step S851). The electronic controller 800 stores the received first learning model 11M together with the data for identifying the traveling situation as the second learning model 82M in the memory 802 (step S853) and ends the processing. The memory 802 stores the first learning model 11M including the multiple learning models as the second learning model 82.

If it is determined that the first learning model 11M does not include the learning model 11MA, 11MB, . . . trained for the judged traveling situation (S151: NO), the electronic controller 110 transmits a request for the second learning model 82M to the information processing device 8 through the wireless communication device 114 (step S155). At step S155, the electronic controller 110 transmits a request while designating the data for identifying the judged traveling situation.

When the information processing device 8 receives the request for the second learning model 82M (step S855), the electronic controller 800 specifies the identification data of the human-powered vehicle 1 with the control device 100 having made the request (step S857).

The electronic controller 800 extracts the second learning models 82M each including the trained learning model for the traveling situation designated in the request out of the multiple second learning models 82 stored in the information processing device 8 (step S859). From the extracted second learning models 82M, the electronic controller 800 selects as candidates the second learning models 82M corresponding to a human-powered vehicle or rider similar to at least one of the human-powered vehicle 1 with the control device 100 having made the request and the rider of the human-powered vehicle (step S861).

At step S861, the electronic controller 800 can select at least one of the methods in the first to third examples described at step S805 in the processing procedure of the flowchart in FIG. 7 according to the first embodiment.

The electronic controller 800 transmits the selected candidates for the second learning model 82M to the electronic controller 110 through the communication device 804 (step S863).

The electronic controller 110 receives from the information processing device 8 the multiple candidates for the second learning model 82M trained with the input information in another human-powered vehicle 1 different in at least one of the human-powered vehicle 1 and the rider (step S157). The electronic controller 110 selects the second learning model 82M from the multiple candidates (step S159).

At step S159, among the multiple candidates, the electronic controller 110 uses the second learning model 82M for which the output information output if input information in the traveling situation for which the first learning model 11M has been trained is input to the learning model used for this traveling situation is similar to the output information output if input information is input to the learning model 11MA, 11MB . . . . More specifically, the electronic controller 110 selects any one of the learning models 11MA, 11MB, . . . for another learned traveling situation that is different from the traveling situation judged at step S133 from the first learning model 11M. The electronic controller 110 selects learning models for the same learned traveling situation from the candidates for the second learning model 82M. The electronic controller 110 stores output information that is output if the input information in the learned traveling situation is input to the selected one of the learning models, for example, the learning model 11MA. The electronic controller 110 stores output information that is output if the input information in the learned traveling situation is input to the learning models selected from the candidates. The electronic controller 110 selects, among the learning models selected from the candidates, the learning model that outputs the output information similar to the output information output from the selected one of the learning models, for example, 11MA. The electronic controller 110 specifies the second learning model 82 as a candidate that includes the selected learning model.

At step S159, among the multiple candidates, the electronic controller 110 uses the second learning model 82M for which control data decided based on the output information obtained if input information of the learned traveling situation in the first learning model 11M is input is similar to control data decided based on the output information obtained if this input information is input to the first learning model 11M. More specifically, the electronic controller 110 selects any one of the learning models 11MA, 11MB, . . . for another learned traveling situation that is different from the traveling situation judged at step S133 from the first learning model 11M. The electronic controller 110 selects learning models in the same traveling situation as the selected one of the learning models, for example, the learning model 11MA from the candidates for the second learning model 82M. The electronic controller 110 inputs the input information for the learned traveling situation to the selected learning model 11MA. The electronic controller 110 acquires control data decided by the device controller 116 based on the output information obtained from the one of the learning models 11MA selected for the learned traveling situation. This control data is not used for control. The electronic controller 110 inputs the input information for the learned traveling situation to the learning models selected from the candidates for the second learning model 82M that are used for the same traveling situation as the learning model 11MA. The electronic controller 110 acquires control data decided by the device controller 116 based on the output information output from the learning models used for the same traveling situation as the leaning model 11MA. Among the candidates for the second learning model 82, the electronic controller 110 selects the second learning model 82M including the learning model that outputs the output information that is the source of the control data similar to the control data decided based on the output information output from the learning model 11MA.

The electronic controller 110 acquires the learning model corresponding to the unlearned traveling situation judged at step S133 that is different from the learned traveling situation out of the multiple learning models included in the selected second learning model 82 (step S161).

The electronic controller 110 executes the interpolation processing by storing the acquired learning model as a learning model for the traveling situation judged at step S133 in the first learning model 11M (step S163) and ends the processing.

Figure 18:
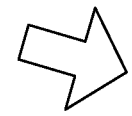
FIG. 18 illustrates processing performed by an interpolation processor according to the fifth embodiment.

FIG. 18 illustrates processing performed by the interpolation processor 118 according to the fifth embodiment. The first learning model 11M in FIG. 18 has originally already learned the learning models 11MA, 11MB and 11MC used for the three on-road related traveling situations out of the nine traveling situations. It has not learned the other traveling situations. In FIG. 17, the learning models 11MA, 11MB and 11MC for the learned traveling situations are represented by solid lines, and the learning models for the unlearned traveling situations are represented by dashed lines.

In the case where the human-powered vehicle 1 with the control device 100 storing the first learning model 11M illustrated in FIG. 18 starts traveling in the off-road situation, the electronic controller 110 judges the traveling situation as off-road by the inclination or the like of the human-powered vehicle 1. The electronic controller 110 judges that the first learning model 11M does not include the learning models trained for the off-road traveling situation (S151: YES). The electronic controller 110 makes a request to the information processing device 8 to acquire candidates for the second learning model 82M including the learning models trained for the off-road traveling situation. The electronic controller 110 selects the second learning model 82M that outputs the most similar output information for the on-road situation among the acquired candidates for the second learning model 82M. The electronic controller 110 acquires the learning models for the off-road traveling situation included in the selected second learning model 82M. As illustrated in FIG. 17, the first learning model 11M is thus interpolated by the model including the learning models 11MD, 11ME, and 11MF trained for the off-road traveling situation.

Figure 19:
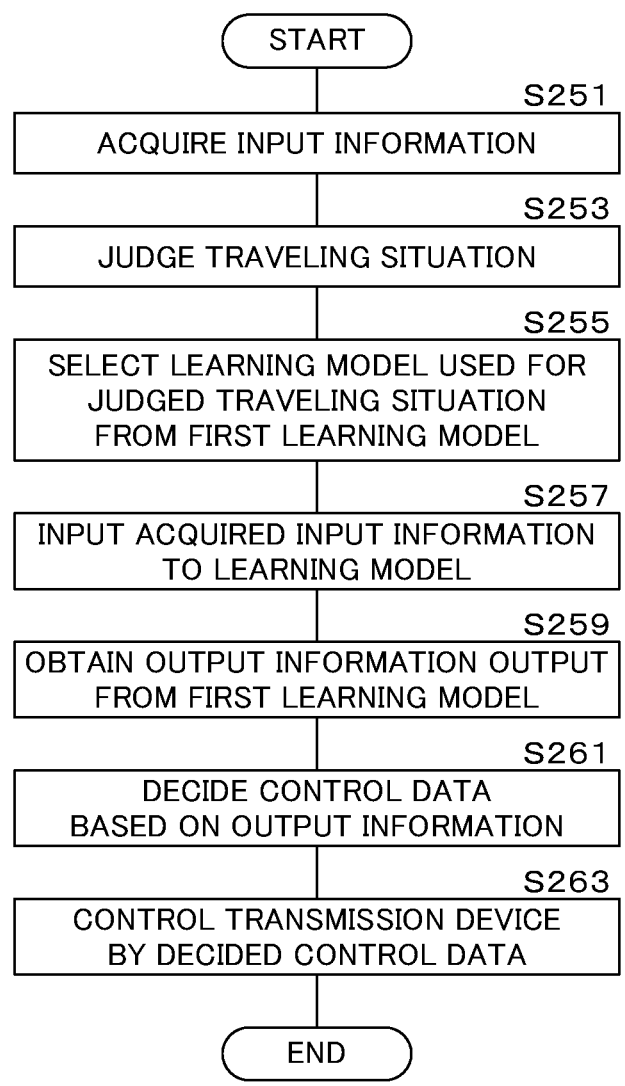
FIG. 19 is a flowchart showing one example of control processing using the first learning model according to the fifth embodiment.

FIG. 19 is a flowchart showing one example of the control processing using the first learning model according to the fifth embodiment. The control device 100 repeatedly executes the following processing in the control mode.

The electronic controller 110 of the control device 100 acquires input information related to traveling of the human-powered vehicle 1 from the sensor 60 (step S251). The electronic controller 110 judges the traveling situation based on the input information acquired from the sensor 60 (step S253).

The electronic controller 110 selects the learning model used for the judged traveling situation from the first learning model 11M (step S255). The electronic controller 110 inputs the acquired input information related to traveling of the human-powered vehicle 1 to the learning model selected at step S255 (step S257). The electronic controller 110 obtains output information output from the first learning model 11M (step S259).

The electronic controller 110 decides control data of the transmission device 31 by the device controller 116 based on the output information obtained at step S227 (step S261). At step S261, the electronic controller 110 can decide the gear ratio itself or decide whether to shift gears or not.

The electronic controller 110 controls the transmission device 31 by the decided control data (step S263) and ends the processing. The electronic controller 110 repeatedly executes the processing at steps S251 to S263.

In the fifth embodiment, as described above, the first learning model 11M is interpolated by another second learning model 82M for the unlearned traveling situation as well. This enables automatic control using the first learning model 11M interpolated by another second learning model 82M even for the unlearned traveling situation as well.

Sixth Embodiment

Figure 20:
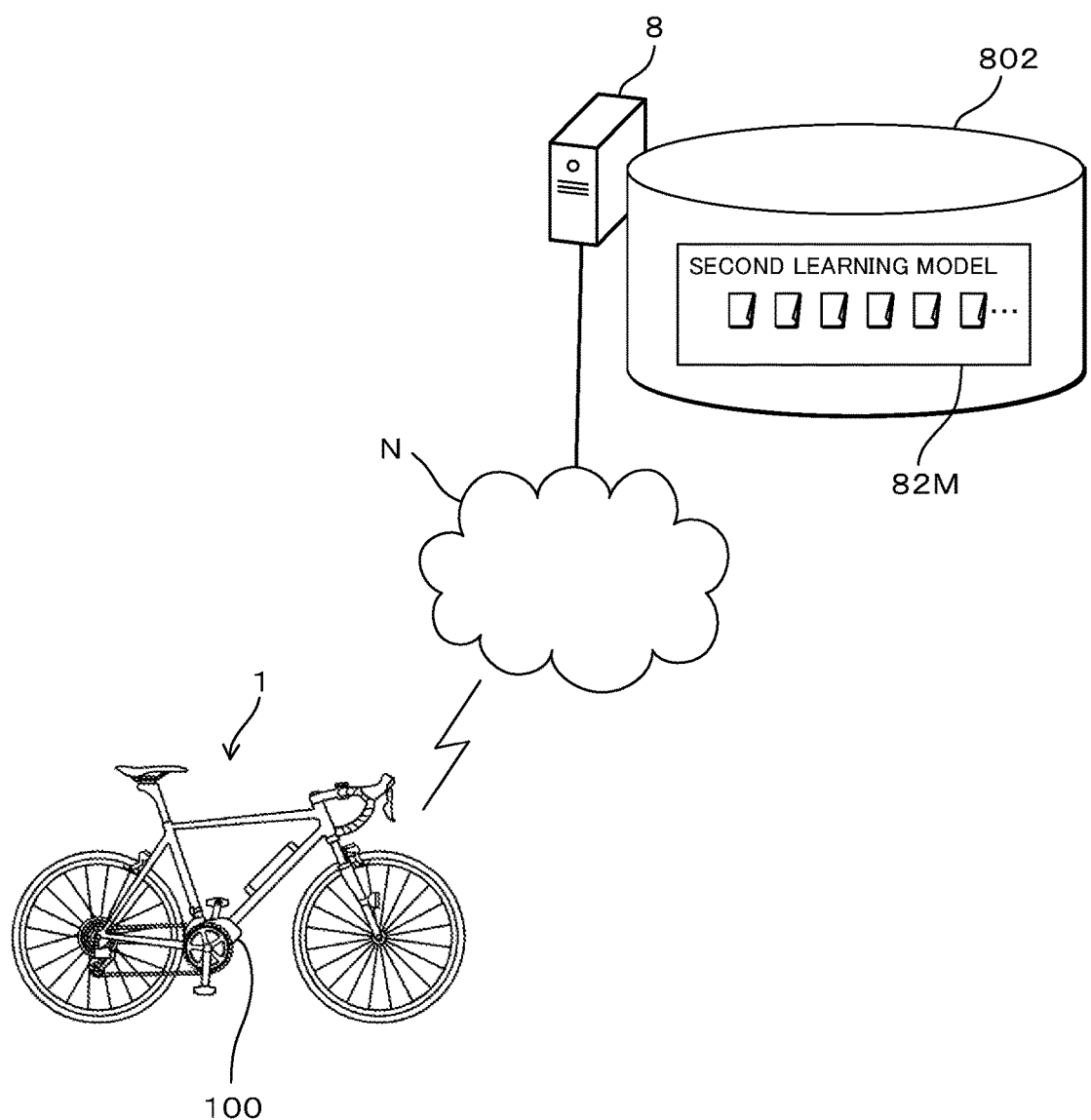
FIG. 20 illustrates a control device and an information processing device according to a sixth embodiment.

FIG. 20 illustrates the control device 100 and the information processing device 8 according to the sixth embodiment. The configuration of the control device 100 according to the sixth embodiment is similar to that of the control device 100 according to the first embodiment. The control device 100 and the information processing device 8 according to the sixth embodiment are similar to those of the first embodiment except for the processing procedure to be described below in the information processing device 8. The parts common to the first embodiment in the configuration of the control device 100 and the information processing device 8 according to the sixth embodiment are denoted by similar reference codes and detailed description thereof will not be repeated.

In the sixth embodiment, the second learning model 82 includes learning models for each traveling situation. In the sixth embodiment, the information processing device 8 creates each learning model by performing statistic processing on parameters including at least one of the weights and biases of the learning models for each traveling situation that are collected from the control devices 100.

Figure 21:
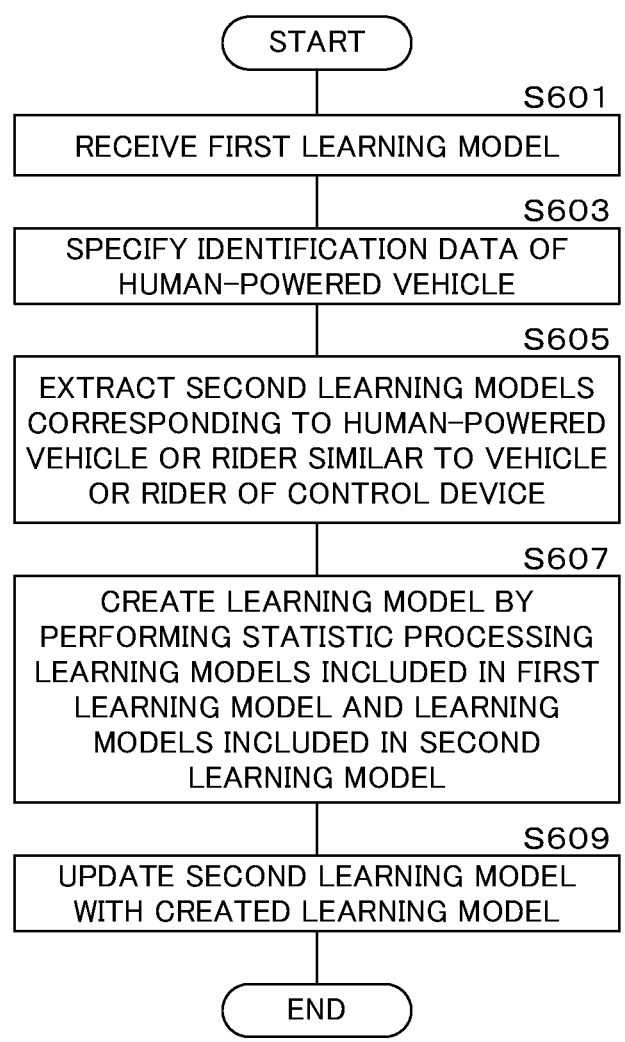
FIG. 21 is a flowchart of an example of a processing procedure of the information processing device according to the sixth embodiment.

FIG. 21 is a flowchart of one example of a processing procedure of the information processing device 8 according to the sixth embodiment. The information processing device 8 executes the following processing when receiving the first learning model 11M sent from the control device 100.

When receiving the first learning model 11M (step S601), the electronic controller 800 specifies the identification data of the human-powered vehicle 1 with the electronic controller 110 as a transmission source (step S603).

The electronic controller 800 extracts second learning models 82M corresponding to a human-powered vehicle or rider similar to at least one of the human-powered vehicle 1 with the control device 100 having made a request and the rider of the human-powered vehicle 1 concerning the received first learning model 11M (step S605). In the information processing device 8, the second learning models 82M are stored for each type of the rider and each type of the human-powered vehicle 1.

At step S605, the electronic controller 800 extracts the second learning model 82M using at least one of the methods in the first to third examples described at step S805 of the flowchart shown in FIG. 7 according to the first embodiment.

The electronic controller 800 performs statistic processing on parameters including at least one of the weights and biases of the learning models for each traveling situation included in the received first learning model 11M and the learning models for each traveling situation included in the extracted second learning model 82M to create learning model (step S607).

The electronic controller 800 updates the second learning model 82M extracted at step S605 with the second learning model 82M including the created learning models (step S609), and ends the processing.

Figure 22:
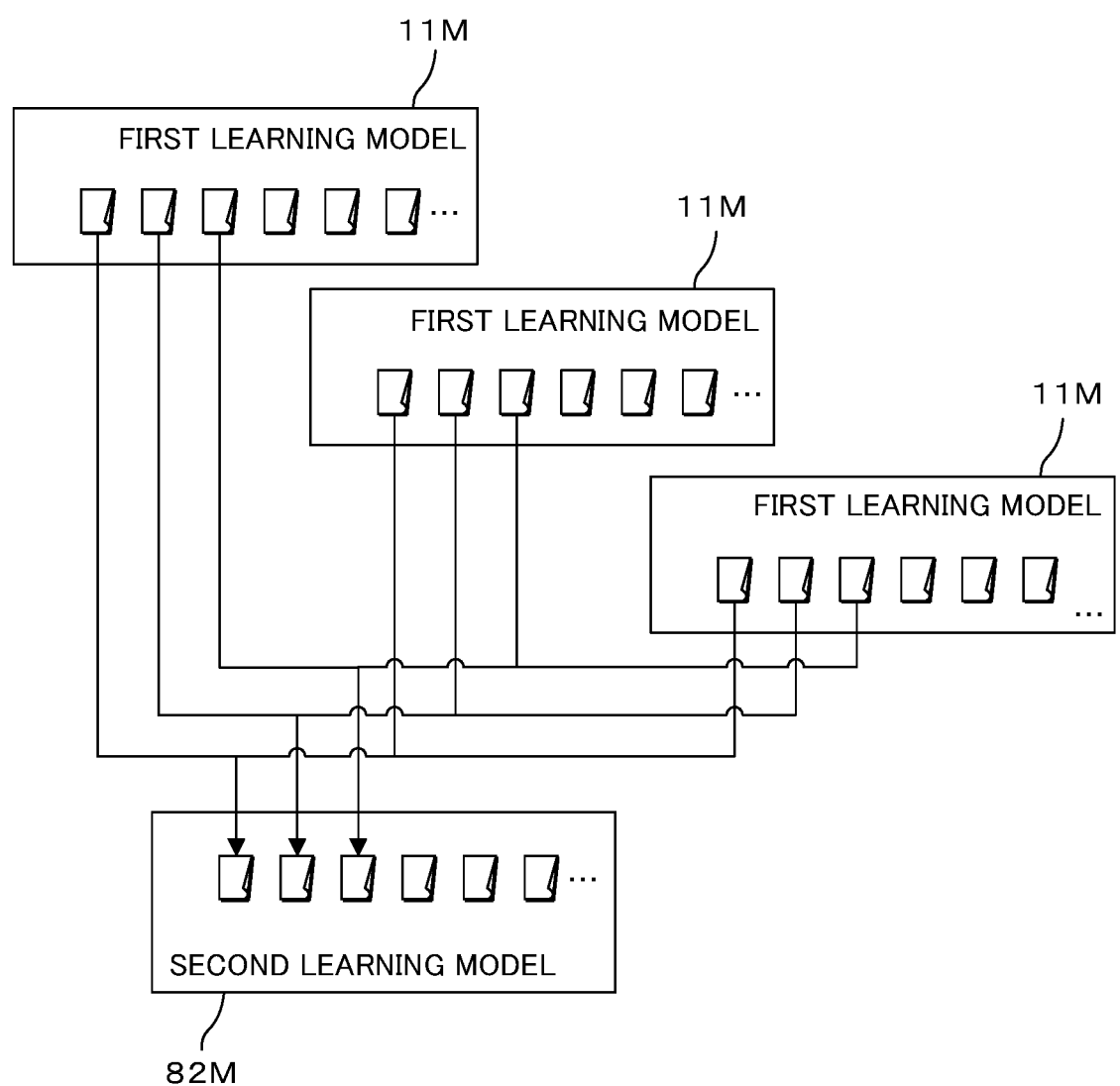
FIG. 22 is a schematic diagram of a second learning model according to the sixth embodiment.

FIG. 22 is a schematic diagram of the second learning model 82 according to the sixth embodiment. In the sixth embodiment, as illustrated in FIG. 22, the second learning model 82 includes learning models for each traveling situation. As illustrated in FIG. 21, the learning models by traveling situation are each acquired by performing statistic processing on the parameters including at least one of the weights and biases of the multiple learning models for the same traveling situation that are collected from the control device 10 of the human-powered vehicle 1 of the rider of the same type.

According to the processing by the information processing device 8 of the sixth embodiment, the second learning model 82M stored in the information processing device 8 is a model acquired by performing statistic processing on models trained in multiple human-powered vehicles 1 and adding up them. The control device 100 can thus perform interpolation using general-purpose second learning models 82M, not learning models for a specific human-powered vehicle 1 or for a specific rider.

It is to be understood that the embodiments disclosed here are illustrative in all respects and not restrictive. The scope of the present invention is defined by the appended claims, not by the above-mentioned meaning, and all changes that fall within the meanings and the bounds of the claims, or equivalence of such meanings and bounds are intended to be embraced by the claims.

What is claimed is:

1. A human-powered vehicle control device comprising:
    at least one sensor configured to acquire input information related to traveling of a human-powered vehicle;
    a memory configured to store a first learning model trained so as to output output information related to control of a device mounted on the human-powered vehicle based on the input information acquired;
    an electronic controller configured to control the device by control data decided based on output information obtained by inputting the input information to the first learning model; and
    an interpolation processor configured to execute processing of interpolating the first learning model stored in the memory using a second learning model trained with input information in a human-powered vehicle different in at least one of the human-powered vehicle and a rider of the human-powered vehicle,
    the electronic controller configured to request the second learning module based upon a comparison using the output information from the first learning module.

2. The human-powered vehicle control device according to claim 1, wherein
    the interpolation processor is configured to update at least part of the first learning model stored in the memory with the second learning model.

3. The human-powered vehicle control device according to claim 1, wherein
    the interpolation processor is configured to train the first learning model using, as training data, input information acquired by the at least one sensor and output information output if the input information is input to the second learning model.

4. The human-powered vehicle control device according to claim 1, wherein
    the first learning model is trained with input information acquired by the at least one sensor in a plurality of traveling situations different from each other, and
    as to a traveling situation that is an unlearned traveling situation different from a learned traveling situation learned by the first learning model and that is learned by a second learning model, the interpolation processor is configured to interpolate the first learning model using the second learning model.

5. The human-powered vehicle control device according to claim 4, wherein
the traveling situation is distinguished by at least one of on-road, off-road and urban district situations.

6. The human-powered vehicle control device according to claim 4, wherein
the traveling situation is distinguished by at least one of uphill, flat and downhill situations.

7. The human-powered vehicle control device according to claim 1, wherein
the first learning model includes a plurality of learning models stored for each traveling situation, and
the interpolation processor is configured to use, as a learning model corresponding to an unlearned traveling situation different from a learned traveling situation learned by the first learning model out of the plurality of learning models, a part of the second learning model that has already learned the unlearned traveling situation.

8. The human-powered vehicle control device according to claim 1, wherein
the interpolation processor is configured to use the second learning which outputs output information using the input information that is similar to output information output by the first learning model using the input information.

9. The human-powered vehicle control device according to claim 8, wherein
the first learning model is trained with input information acquired by the at least one sensor for a plurality of traveling situations different from each other, and
out of a plurality of the second learning models, the interpolation processor is configured to use the second learning model which outputs output information using the input information in a traveling situation already learned by the first learning model that is similar to output information output by the first learning model using the input information.

10. The human-powered vehicle control device according to claim 8, wherein
the first learning model and the second learning model each include a plurality of learning models stored for each traveling situation,
the interpolation processor is configured to
use, out of a plurality of the second learning models, the second learning model which outputs output information using the input information in a traveling situation already learned by the first learning model that is similar to output information output by the first learning model using the input information, and
acquire, out of the plurality of learning models included in the second learning model, the learning model that corresponds to an unlearned traveling situation different from the learned traveling situation.

11. The human-powered vehicle control device according to claim 1, wherein
the interpolation processor is configured to use a second learning model used in another human-powered vehicle control device similar in control data decided based on the same input information.

12. The human-powered vehicle control device according to claim 11, wherein
the first learning model is trained with input information acquired by the at least one sensor in a plurality of traveling situations different from each other, and
the interpolation processor is configured to use, out of a plurality of the second learning models, the second learning model for which control data decided based on output information from the second learning model using the input information in a traveling situation already learned by the first learning model is similar to control data decided based on output information output if from the first learning model using the input information.

13. The human-powered vehicle control device according to claim 11, wherein
the first learning model and the second learning model each include a plurality of learning models stored for each traveling situation,
the interpolation processor is configured to
use, out of a plurality of the second learning models, the second learning model for which control data decided based on output information from the second model using the input information in a traveling situation already learned by the first learning model is similar to control data decided based on output information from the first learning model using the input information, and
acquire, out of the plurality of learning models included in the second learning model, the learning model corresponding to an unlearned traveling situation different from the learned traveling situation.

14. The human-powered vehicle control device according to claim 1, wherein
the interpolation processor is configured to use, out of a plurality of the second learning models, the second learning model that is trained with input information in another human-powered vehicle the same as or similar to, in at least one of type and size, the human-powered vehicle.

15. The human-powered vehicle control device according to claim 1, wherein
the interpolation processor is configured to use, out of a plurality of the second learning models, the second learning model that is trained with input information of another human-powered vehicle mounted with a device having the same type and manufacture as or similar type and manufacturer to the device.

16. The human-powered vehicle control device according to claim 15, wherein
the device is distinguished by at least one type of a transmission device, a suspension, a seat post, a brake device and an assist device.

17. The human-powered vehicle control device according to claim 1, wherein
the interpolation processor is configured to use, out of a plurality of the second learning models, the second learning model that is trained with input information for a human-powered vehicle of a rider of the same type as or similar type to a rider of the human-powered vehicle.

18. The human-powered vehicle control device according to claim 1, wherein
the first learning model stored in the memory is sent to another device.

19. The human-powered vehicle control device according to claim 1, wherein
the second learning model is a model acquired by performing static processing on parameters including at least one of weights and biases of a plurality of models trained in a plurality of other human-powered vehicles.

20. A learning method causing a computer mounted on a human-powered vehicle to execute processing of:
- selecting externally, based upon a comparison using output information from a first learning model trained so as to output output information related to control of a device mounted on the human-powered vehicle based on input information related to traveling of the human-powered vehicle, a second learning model trained with input information in a human-powered vehicle different in at least one of the human-powered vehicle and a rider of the human-powered vehicle;
- performing interpolation processing of the first learning model using the second learning model selected;
- deciding control data based on output information obtained by inputting the input information to the first learning model interpolated; and
- controlling the device with the control data decided.

21. A human-powered vehicle control method causing a computer mounted on a human-powered vehicle to execute the processing of:
- selecting externally, based upon a comparison using output information from a first learning model trained so as to output output information related to control of a device mounted on the human-powered vehicle based on input information related to traveling of the human-powered vehicle, a second learning model trained with input information in a human-powered vehicle different in at least one of the human-powered vehicle and a rider of the human-powered vehicle;
- performing interpolation processing of the first learning model using the second learning model selected;
- deciding control data based on output information obtained by inputting the input information to the first learning model interpolated; and
- controlling the device with the control data decided.

22. A computer program disposed upon a non-transitory computer readable storage medium and executable by a computer mounted on a human-powered vehicle, the computer program being configured to cause the computer to execute the processing of:
- selecting externally, based upon a comparison using output information from a first learning model trained so as to output output information related to control of a device mounted on the human-powered vehicle based on input information related to traveling of the human-powered vehicle, a second learning model trained with input information in a human-powered vehicle different in at least one of the human-powered vehicle and a rider of the human-powered vehicle;
- performing interpolation processing of the first learning model using the second learning model selected;
- deciding control data based on output information obtained by inputting the input information to the first learning model interpolated; and
- controlling the device with the control data decided.

* * * * *